(12) United States Patent
Jamkhedkar et al.

(10) Patent No.: US 12,130,785 B2
(45) Date of Patent: Oct. 29, 2024

(54) DATA QUALITY CONTROL IN AN ENTERPRISE DATA MANAGEMENT PLATFORM

(71) Applicant: PAYPAL, INC., San Jose, CA (US)

(72) Inventors: Prashant Jamkhedkar, Fremont, CA (US); Nalini Johnas, Newark, CA (US); Ravinder Dhamija, Dublin, CA (US); Daniel Oing, Scotts Valley, CA (US); Senthil Vellaichamy, Chennai (IN); Durga Rathinasamy, Chennai (IN); Rajagopal Ramakrishnan, Chennai (IN); Jose Smithesh Joseph, Kollam (IN); Tariq Akhtar Shaikh, San Jose, CA (US); Venkateshan Sundaram, San Ramon, CA (US); Viswanathan Varadarajan, Pleasanton, CA (US)

(73) Assignee: PAYPAL, INC., San Jose, CA (US)

( * ) Notice: Subject to any disclaimer, the term of this patent is extended or adjusted under 35 U.S.C. 154(b) by 196 days.

(21) Appl. No.: 17/686,272

(22) Filed: Mar. 3, 2022

(65) Prior Publication Data

US 2023/0205742 A1 Jun. 29, 2023

(30) Foreign Application Priority Data

Dec. 24, 2021 (IN) .............................. 202141060586

(51) Int. Cl.
*G06F 16/21* (2019.01)
*G06F 16/215* (2019.01)
(Continued)

(52) U.S. Cl.
CPC ........ *G06F 16/215* (2019.01); *G06F 16/2393* (2019.01); *G06F 16/258* (2019.01)

(58) Field of Classification Search
CPC .. G06F 16/215; G06F 16/2393; G06F 16/258; G06F 16/24564; G06F 16/1794;
(Continued)

(56) References Cited

U.S. PATENT DOCUMENTS 7,233,952 B1 6/2007 Chen
11,096,059 B1 8/2021 Shahidzadeh
(Continued)

FOREIGN PATENT DOCUMENTS

AU 2019236628 B2 11/2022
WO 2007064994 A1 6/2007
WO 2015008026 A1 1/2015

OTHER PUBLICATIONS

International Search Report and Written Opinion for Application No. PCT/US2022/052889 mailed on Mar. 20, 2023, 21 pages.

*Primary Examiner* — Kris E Mackes
*Assistant Examiner* — Cecile H Vo
(74) *Attorney, Agent, or Firm* — Haynes and Boone, LLP

(57) ABSTRACT

Methods and systems are presented for collectively storing, managing, and analyzing data associated with different data sources. A data management system defines an enterprise data model schema based on different data model schemas associated with the different data sources. The data management system generates, for each data source, an enterprise data model instance based on the enterprise data model schema. Data is ingested from the different data sources, and then transformed and stored in a corresponding enterprise data model instance based on a mapping between a corresponding data model schema and the enterprise data model schema. Upon ingesting the data from the data sources, one or more consolidated data views are generated that combine at least portions of data from different enterprise data model instances. The data arranged according to the one or more (Continued)

consolidated data views is presented on a device and/or further analyzed to produce an analysis outcome.

20 Claims, 10 Drawing Sheets

(51) Int. Cl.
   *G06F 16/23* (2019.01)
   *G06F 16/25* (2019.01)
(58) Field of Classification Search
   CPC . G06Q 20/4015; G06Q 20/4016; G06Q 40/02
   See application file for complete search history.

(56) References Cited

U.S. PATENT DOCUMENTS

| | | |
|---|---|---|
| 2005/0149552 A1 | 7/2005 | Chan et al. |
| 2007/0203923 A1 | 8/2007 | Thomas |
| 2008/0046334 A1 | 2/2008 | Lee et al. |
| 2008/0114785 A1 | 5/2008 | Bernstein et al. |
| 2008/0313232 A1 | 12/2008 | Edelstein et al. |
| 2012/0166818 A1 | 6/2012 | Orsini et al. |
| 2012/0259753 A1* | 10/2012 | Orad ...................... G06Q 40/00 705/35 |
| 2016/0154830 A1 | 6/2016 | Papotti et al. |
| 2017/0017887 A1 | 1/2017 | Waradkar |
| 2018/0270290 A1 | 9/2018 | Sinha et al. |
| 2018/0357559 A1 | 12/2018 | Truong et al. |
| 2019/0130262 A1* | 5/2019 | Teredesai ................ G06N 20/20 |
| 2019/0228419 A1 | 7/2019 | Sampath |
| 2020/0097476 A1 | 3/2020 | Tran et al. |
| 2020/0242417 A1 | 7/2020 | Sagi et al. |
| 2020/0322358 A1* | 10/2020 | Farrell ................ H04W 12/122 |
| 2020/0380531 A1 | 12/2020 | Vaidya et al. |
| 2020/0394317 A1 | 12/2020 | White et al. |
| 2021/0117437 A1 | 4/2021 | Gibson |
| 2022/0171759 A1 | 6/2022 | Jindal et al. |
| 2022/0253856 A1* | 8/2022 | Wong ..................... G06N 3/088 |
| 2022/0303249 A1 | 9/2022 | Imabayashi et al. |
| 2023/0067777 A1 | 3/2023 | Hadar et al. |
| 2023/0202743 A1* | 6/2023 | Tieben .............. H01L 21/67359 206/454 |
| 2023/0205741 A1* | 6/2023 | Jamkhedkar .......... G06F 16/258 707/692 |
| 2023/0394164 A1* | 12/2023 | Pavuluri ................ G06F 40/40 |

* cited by examiner

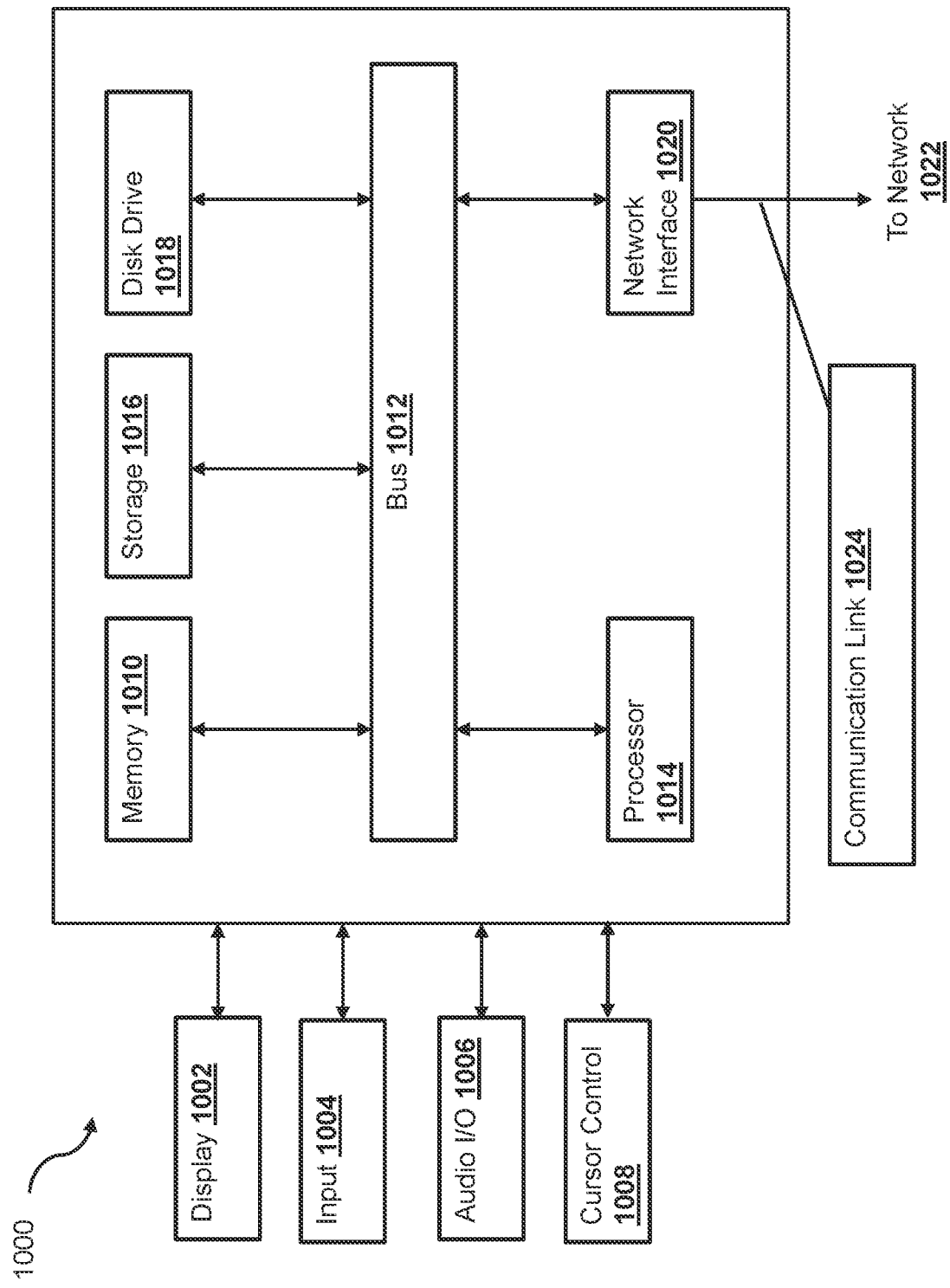

DATA QUALITY CONTROL IN AN ENTERPRISE DATA MANAGEMENT PLATFORM

CROSS REFERENCE TO RELATED APPLICATION

The present application claims priority to India Provisional Patent Application Serial No. 202141060586, filed Dec. 24, 2021, which is hereby incorporated by reference in its entirety.

BACKGROUND

The present specification generally relates to electronic data management and data structures, and more specifically, to an enterprise data management platform that consolidates data from multiple entities according to various embodiments of the disclosure.

RELATED ART

In today's digital age, data has become a critical asset for many organizations. Data that is collected, retrieved, or otherwise obtained by an organization can help the organization with many functionalities, such as predicting a trend, assessing a risk, complying with certain rules and regulations, etc. In order to be able to efficiently store and access the data (e.g., for analysis), an organization may design an enterprise data model that defines relationships among various data types (e.g., various data attributes) for the organization. Data may then be stored in data structures according to the enterprise data model, such that various devices and computer applications within the organization can efficiently access the data.

However, as an organization grows and in some cases through mergers and acquisitions, the organization may encounter data from different divisions or groups that is associated with different data models used by the different divisions or groups prior to the mergers or acquisitions. The incompatibility of the different data models prevents the data within the organization to be integrated and analyzed collectively. As such, there is a need for providing a framework that provides a uniform way of storing and accessing data within an organization.

BRIEF DESCRIPTION OF THE FIGURES

FIG. 10 is a block diagram of a system for implementing a device according to an embodiment of the present disclosure.

Figure 1:
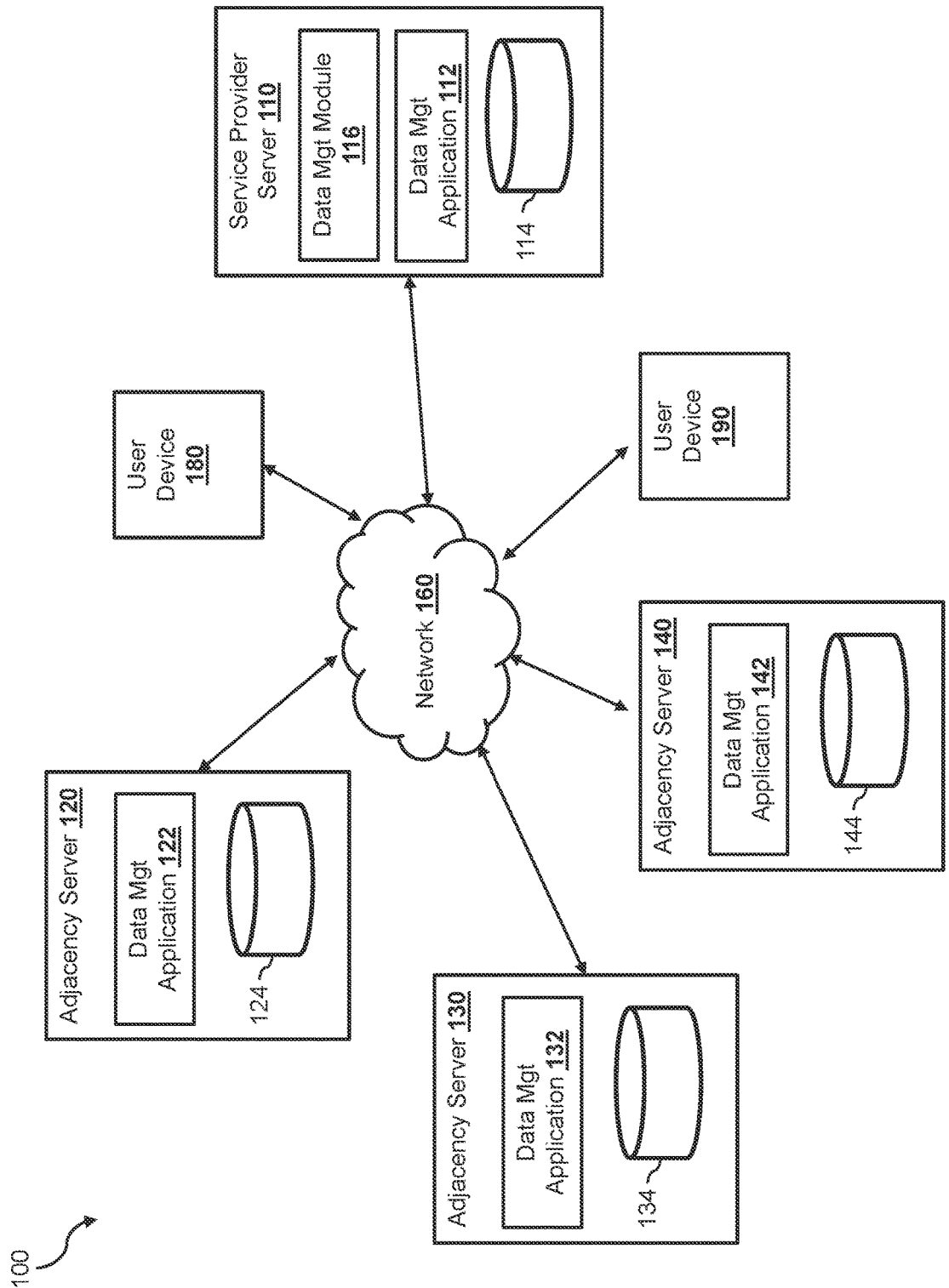
FIG. 1 is a block diagram illustrating a networked system that includes a data management system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a data management system for storing, managing, and providing access to data from different sources. As discussed herein, an organization may use a data model schema, that defines relationships among different data types (e.g., different data attributes) relevant to the organization, to store data of the organization in an organized and structured manner. A data model schema may include definitions for the different data types, and relationships among the different data types. For example, if the organization is an electronic payment processing service provider, a data model schema used by the organization may include data types (e.g., data attributes) related to online transactions, such as a "transaction date" data type, a "transaction category" data type, a "merchant identity" data type, etc., data types related to a funding source, such as a "card number" data type, an "expiration date" data type, a "security code" data type, etc., data types related to users, such as a "name" data type, a "birthday" data type, a "gender" data type, a "social security number" data type, a "phone number" data type, an "address" data type, etc., and other data types. The data model schema may also define how the different data types are related. For example, the data model schema may specify a first data structure for storing data associated with the transactions data types, a second data structure for storing data associated with the payment data types, and a third data structure for storing data associated with the user data types. The data model schema may specify that a "transaction" (e.g., a data record in the transaction data structure) must be associated with a "funding source" (e.g., a data record in the payment data structure) used to conduct the transaction and a "user" (e.g., a data record in the user data structure) who conducted the transaction.

A uniform data model schema across the entire organization for organizing data enables efficient access, retrieval and analysis of the data for the organization. However, as the organization grows, other organizations (also referred to as "adjacencies" of the organization, and each of the organization and the adjacencies may be simply referred to as an "entity") may become associated with that organization, possibly through mergers and/or acquisitions, or any other ways to become affiliated or otherwise associated with the organization. An adjacency may be used to refer to a division, a sub-division, a subsidiary, a partner, a vendor, a customer, or other related entities of the organization. Data that comes from different sources (e.g., different data storges and management systems associated with different entities) may be organized using different data model schemas. For example, a data model schema associated with an entity (e.g., an adjacency of the organization, the organization, etc.) may include additional data types that do not exist in the data of another entity, may have a different definition of a data type than a corresponding data type associated with another entity, and/or may have a different relationship between two data types than the relationship between two corresponding data types associated with another entity.

Due to the incompatibility of the different data model schemas used for storing data associated with the different entities (e.g., the organization and the different adjacencies), computer devices (and/or computer software applications) that are configured to access data from one entity (e.g., the organization) may not be able to access data from another entity (e.g., an adjacency). For example, the data storage associated with the organization may require a specific set of interfaces (e.g., application programming interfaces (APIs), etc.) and protocols for accessing the data that are different from what are required to access data in the data storages associated with the different adjacencies, such that the APIs and protocols used by the computer devices (and/or computer software applications) to access data associated with the organization are not compatible with accessing data associated with the different adjacencies. In addition, since the different data model schemas define different relationships among the data types for the organization and the adjacencies, the data structures (e.g., organizations of tables, how tables are linked to one another, etc.) used to store data associated with one entity are different from those used to store data associated with another entity. Thus, the computer devices (and the computer software applications) that are configured to access data associated with the organization based on traversing the data structures associated with the organization may not be able to access corresponding data associated with the other adjacencies. Similarly, the computer devices (and the computer software applications) that are configured to access data from one adjacency may not be able to access data from the organization or other adjacencies because each adjacency may use a different data model schema to store the corresponding data.

Furthermore, for the same reasons discussed above, the data from the organization and the data from the adjacencies cannot easily be viewed and analyzed collectively. For example, since data sets from two different entities may have different definitions and/or relationships among the data types, it is challenging to provide a comparison of the data sets and/or provide a merged data view that includes both data sets. It has also been recognized by the inventors that allowing efficient access and analysis of data across the organization and the adjacencies can improve data and network security, data compliance, and efficiency of different support groups within the organization and the adjacencies (e.g., accounting, finance, security, etc.).

As such, according to various embodiments of the disclosure, the data management system may be configured to automatically integrate the data associated with different entities (e.g., the organization and the adjacencies) and provide consolidated data views and collective analyses of the data associated with the different entities. In some embodiments, the data management system may define an enterprise data model schema based on the data types associated with the different entities (e.g., the organization and its adjacencies). As discussed herein, since the data associated with one entity may include one or more data types that do not exist in the data associated with another entity, the enterprise data model schema may encompass all of the data types associated with the organization and its adjacencies, and provide uniform definitions for the data types associated with the entities. For example, the data management system may traverse the data storages associated with the different entities to obtain all of the data types (e.g., a user name, a social security number, a funding source identifier, a transaction identifier, a location, an Internet Protocol address, a product or a service associated with a transaction, an amount associated with a transaction, etc.) associated with the different entities. The data management system may analyze the data types to identify common data types (e.g., even though the names may be different for different entities). The data management system may then generate a set of data types for the enterprise data model schema that encompasses all of the data types associated with the different entities. The set of data types may have a uniform naming convention such that a data type having a data type name (e.g., "user_name") may correspond to related data types associated with the different entities, which may have different names (e.g., "username," "u_name," "u_n," etc.). Furthermore, the enterprise data model schema may define a set of uniform relationships among the set of data types, such that data associated with the different entities can be stored in a common schema that defines how data is stored in different data structures and how the different data structures may be connected with each other.

Upon defining the enterprise data model schema, the enterprise data management system may begin ingesting data from the data storages associated with the organization and the adjacencies. In some embodiments, the enterprise data management system may include a server (also referred to as a "data management module" implemented within a server) configured to store and access the data associated with the organization and the adjacencies. The enterprise data management system may also include client applications (also referred to as "data management applications"). Client applications may be implemented locally at the data storages of the organization and the adjacencies, and configured to communicate with the server (the data management module) to facilitate the data management functionalities described herein. Thus, a corresponding client application may be deployed within each data storage associated with an entity (e.g., the organization or an adjacency). Each client application may be configured to obtain the data from the corresponding data storage and communicate the data to the server.

For each entity (e.g., the organization or an adjacency), the data management system may create a corresponding enterprise data model instance based on the enterprise data model schema for storing data received from that entity. An enterprise data model instance may include distinct data structures that follow the enterprise data model schema. Since each enterprise data model instance is created based on the enterprise data model schema, each enterprise data model instance may include data structures having identical characteristics (e.g., the same number of tables, the same fields in each table, etc.) and the same relationships among data types and among the data structures (e.g., same links between the different data structures). As data is received from a particular data storage corresponding to a particular entity (e.g., the organization or an adjacency), the server may be configured to map the data from the corresponding data model schema associated with the entity to the enterprise data model schema. In some embodiments, the server may also transform the data before the transformed data is stored in the corresponding enterprise data model instance according to the mapping between the data model schema associated with the entity and the enterprise data model schema. The transformation may include normalizing the data such that data of the same (or similar type) across different entities may be stored in the enterprise data model instances according the same scale (e.g., a risk score between 0 to 100, a rating between 1 and 5, etc.). The transformation may also include converting the data to a common unit (e.g., U.S. dollars for a monetary amount, inches for length, etc.). Thus, after the initial ingestion of data from the data storages, the server may store a copy of data from each of the entities in a common format within a corresponding enterprise data model instance.

After the initial ingestion of data from the entities, the data management system may continue to update the data in the enterprise data model instances based on updates to the data stored in the data storages associated with the entities. For example, since each of the entities may still conduct transactions with its users using its data storages, new data may continuously be added, and data may continuously be modified, in those data storages associated with the entities. As such, the data management system may continue to process the new data and data changes to ensure that the data within the data management system is current.

In some embodiments, the data management system may support different ingestion modes for ingesting data from the data storage associated with the organization and the adjacencies. For example, the data management system may support a push streaming mode, a push batch mode, and a pull batch mode. Each of the client applications may be configured (e.g., by an administrator of the corresponding organization or the corresponding adjacency) to cooperate with the server to perform the data ingestion process according to one or more of the available modes. When a client application deployed at a data storage is configured to perform the data ingestion process in a push streaming mode, the client application may monitor data of the data storage to detect any new data or a change of existing data at the data storage. Whenever any new data or a change of data is detected at the data storage, the client application may obtain the new data or the data change, and may actively push streaming events (e.g., transmit via events associated with the server) the new data and/or the data change to the server.

When a client application deployed at a data storage is configured to perform the data ingestion process in a push batch mode, the client application may monitor data of the data storage to detect any new data or a change of existing data at the data storage. The client application may obtain any new data and/or data changes during a time period (e.g., an hour, a day, etc.), and add the new data and/or the data changes to a batch data structure (e.g., a batch file, etc.). The client application may be configured to push (e.g., transmit via the API associated with the server) the batch file, which includes all the new data and data changes detected during a past time period, to the server at predetermined times (e.g., periodically, etc.).

When a client application deployed at a data storage is configured to perform the data ingestion process in a pull batch mode, the client application may monitor data of the data storage to detect any new data or a change of existing data at the data storage. The client application may obtain any new data and/or data changes, and add the new data and/or the data changes to a batch data structure (e.g., a batch file, etc.). When the client application receives a signal (e.g., a pull signal) from the server, the client application may be configured to transmit, via an API associated with the server, the batch file, which includes all the new data and data changes detected since the last time the client application transmitted a batch file to the server. After transmitting the batch file to the server, the client application may clear the batch file, and may begin to record new data or data changes to the batch file again.

As such, different data from different data storages (e.g., data storages associated with the organization and the adjacencies) may arrive at the server at different times. Whenever information indicates new data or changes or data from an entity is received by the server (e.g., transmitted from a client application), the server may be configured to transform the data (or the changes of data) and map the data (or the changes of data) to a data record in a corresponding enterprise data model instance corresponding to the entity.

In some embodiments, when a new entity joins the data management system (e.g., a new adjacency becomes affiliated to the organization, etc.), the data management system may create a new enterprise data model instance for the new entity, and may deploy a new client application at one or more data storages associated with the new entity. The server and this new client application may collaborate to perform the initial data ingestion from the one or more data storages associated with the new entity, and may configure the new client application to monitor and update the enterprise data model instance corresponding to the new entity based on any updates to the one or more data storages associated with the new entity.

Storing data from various entities in different enterprise data model instances that correspond to a uniform enterprise data model schema has many benefits. First, it enables the data management system (or any third-party data consumer software applications that accesses the data management system) to access the data associated with the different entities using a uniform interface (e.g., a uniform data access protocol such as SQL, etc.). For example, instead of using different protocols to access data stored in data storages associated with different entities, the data management system may access the data associated with the different entities using the common protocol, which allows for reduction of computer software complexity and enhancement of speed. Second, the common enterprise data model schema used to store data associated with the different entities enables the data management system to merge data from different entities for easier presentation and/or analysis.

In some embodiments, based on the common enterprise data model schema, the data management system may generate one or more consolidated data views for presentation and/or access by the data management system and/or other computer software applications that access the data management system. Different data consumers (e.g., different departments and/or divisions within the organization) may access and use the data stored in the data management system differently. As such, while the common organization of the data according to the enterprise data model schema enables easy access to the data stored in the different enterprise data model instances, the organization of the data according to the enterprise data model schema may not be relevant or meaningful to all data consumers.

As such, data views can be generated to provide different virtual views of the data for different data consumers. A data view, which may also be referred to as a data set or a data mart is a virtual and temporary data structure for visualization of at least a portion of the data stored in a data repository (e.g., in the enterprise data model instances). A data view may have an organization of various data types that is different from the way that the data is actually organized when it is stored in the enterprise data model instances. As such, data views can be useful for providing unique views or presentations of data based on different focuses. For example, an account-focused data view may be generated that compiles data in an accounting-focused organization (e.g., having a focus on monetary amounts being transacted instead of other attributes, etc.) while a risk-focused data view may be generated that compiles data in a risk-focused organization (e.g., having a focus on risk attributes, such as transaction locations, transaction frequencies, etc. instead of other attributes, etc.). Thus, each data view may include a different subset of data types from the enterprise data model schema and/or a different organization of the data types than the actual organization in the enterprise data model instances. Having different data views enable different data consumers (e.g., agents from the accounting department of the organization, agents from the risk department of the organization, etc.) to consume the data stored in the enterprise data model instances in a more relevant and meaningful way.

In some embodiments, the common enterprise data model schema used for storing data associated with different entities in the enterprise data model instances enables the data management systems to generate consolidated data views that combine data from multiple enterprise data model instances. Similar to the data view discussed herein, each consolidated data view may have a particular subset of data types and a particular organization of the particular subset of data types, that is different from the way that the data is organized when it is stored in the enterprise data model instances. Furthermore, each consolidated data view may have a particular focus (e.g., accounting, finance, risk, etc.). Instead of viewing only the data from a single enterprise data model instance according to the data organization, a consolidated data view may generate the virtual and temporary data structure for presenting data that is merged from multiple enterprise data model instances. For example, the data management system may compile, for an accounting-focused consolidated data view, transaction data having an accounting focus from different enterprise data model instances (e.g., transactions conducted with different entities). The data management system may then present the data organized according to the accounting-focused consolidated data view on a user device. In another example, the data management system may compile, for a risk-focused consolidated data view, risk data of users with different entities from different enterprise data model instances. The data management system may then present the data organized according to the risk-focused consolidated data view on a user device.

In some embodiments, the data management system may further analyze the data organized under a consolidated data view, and may provide an outcome of the analysis on a user device. For example, using the data that is organized in the accounting-focused consolidated data view, the data management system may analyze accounting data across different entities. The data management system may generate an accounting report and present the accounting report on a user device of a data consumer. In another example, using the data that is organized in the risk-focused consolidated data view, the data management system may analyze a risk associated with a user (who may have been conducting transactions with the different entities). The data management system may generate a risk outcome for the user and present the accounting report on a user device of a data consumer.

In addition to providing ease of access to various data from different entities, the data management system of some embodiments may provide enhanced data security for the ingestion, storage, and management of data. For example, during ingestion of data from the data storages associated with the entities, each client application deployed at a data storage may be configured to obtain the data from the data storage, encrypt the data (e.g., using a public key associated with the server), and then transmit the encrypted data to the server. Upon receiving the encrypted data, the server may use a private key corresponding to the public key to decrypt the encrypted data, prior to performing the data processing (e.g., transformation of data, mapping of data according to the enterprise data model schema, etc.) and storing the decrypted data in a corresponding enterprise data model instance.

Data that is stored in the data storages associated with the different entities may be classified into different security levels. For example, the data can be classified into five security categories (e.g., Class 1 to Class 5), where Class 1 data has the highest sensitivity and Class 5 data has the lowest sensitivity. Data that has a high sensitivity classification (e.g., Class 2 or above, etc.), such as credit card data (e.g., credit card numbers,), personally identifiable information (PII) data (e.g., social security numbers, license numbers, etc.), personal health information, and others, may be encrypted while stored in the data storages. Each entity may use its own encryption algorithm and/or encryption key(s) to encrypt the sensitive data within its data storages. Thus, when the data is stored in the respective data storages of the different entities, it is a challenge to identify if a portion of data stored in a data storage of a first entity (e.g., transaction data associated with transactions conducted by a particular user with the first entity) is related to a portion of data stored in a data storage of a second entity (e.g., transaction data associated with transactions conducted by the particular user with the second entity).

As a client application obtains the data from a corresponding data storage, the client application may determine that certain data is classified as high sensitivity (e.g., Class 2 data or above, etc.), indicating that the data has been encrypted by the corresponding entity. In some embodiments, the client application may use an API associated with the corresponding entity to decrypt the encrypted data. The data may be decrypted using the encryption algorithm and the encryption key associated with the corresponding entity. After the data is decrypted, the client application may then re-encrypt the data using the public key of the server before transmitting the encrypted data to the server. Since the client application is deployed within the environment of the corresponding entity (e.g., deployed within a server associated with the corresponding entity), the decryption of the data by the client application does not introduce any security risk for the corresponding entity. Furthermore, since the data is immediately re-encrypted using the public key of the server before transmitting to the server, the security of the data is ensured.

As discussed herein, once the data is received by the server, the server may decrypt the data using the corresponding private key. In some embodiments, the server may identify highly sensitive data (e.g., data that has been classified as Class 2 or above, etc.) among the data received from a client application. For example, the data received from the data storage may include transaction data associated with transactions conducted with the corresponding entity. The transaction data may include sensitive data such as credit card numbers, bank account numbers, social security numbers, or PII data. Upon identifying the sensitive data, the server may store the sensitive data in a vault. In some embodiments, the server may create a data record, in the vault, for each distinct sensitive data it receives from any one of the client applications. Each data record may include an index value (e.g., a primary key, etc.). The server may store the sensitive data received from a client application in the corresponding data record in the vault. In some embodiments, the server may also encrypt the sensitive data before storing the encrypted sensitive data in the data record to further improve the security of the sensitive data. In some embodiments, the data management system may provide additional security for the vault. For example, the vault may be physically or communicatively separated from the enterprise data model instances such that the data management system may allow certain devices and/or software applications to access the enterprise data model instances, but not the vault.

After storing the sensitive data in a data record in the vault, the server may replace the data with the index value of the data record in the vault before storing the data in the corresponding enterprise data model instance. As such, sensitive data that is stored in any one of the enterprise data model instances may be obfuscated using the corresponding index value, while the actual sensitive data (or the encrypted version thereof) is stored in the vault. The separation of the actual sensitive data from the enterprise data model instances further enhances data security of the data management system. While the sensitive data stored in the enterprise data model instances are obfuscated (e.g., based on the replacements with the corresponding index values associated with the vault), the data management system is capable of comparing the sensitive data across different enterprise data model instances using the techniques described herein. For example, as new data is received from client applications, the data management system may continue to identify sensitive data within the new data.

During the ingestion process, the server may access the sensitive data in its clear-text format (e.g., the sensitive data is decrypted using the private key of the server) and determine whether a data record for such sensitive data exists in the vault already. If the sensitive data has not been stored as a data record in the vault, the server may create a new data record in the vault for the sensitive data. However, if a data record for the sensitive data already exists in the vault (e.g., created based on a previously received sensitive data possibly from another client application, etc.), the server may store the sensitive data (along with the reference to the source of the sensitive data such as an identifier of the client application or the data storage from which the sensitive data is received) in the same data record. The server may then use the index value (e.g., the primary key) of that data record in the vault to replace the sensitive data to be stored in the corresponding enterprise data model instance. This way, while the sensitive data stored in the enterprise data model instances are obfuscated, the data management system can still determine identical sensitive data that is stored in different enterprise data model instances based on the corresponding index values.

In some embodiments, the data management system may perform certain data analyses based on identifying related data across different enterprise data model instances. For example, the data management system may determine patterns of related transactions conducted with different entities. The related transactions may be related based on a common attribute, such as a common funding source used (e.g., identical credit card numbers identified based on the common index values, etc.), a common user-identifier (e.g., identical social security numbers identified based on the common index values, etc.), a common address, etc. The data analyses may include determining whether the transaction pattern associated with the common attributes correspond to a suspicious behavior (e.g., frauds, etc.). The data analyses may also include compliance of certain laws or regulations and tax preparations for certain jurisdictions. The ability to accumulate transaction data across various entities in real-time to perform such data analyses enables the data management system (and other computer systems that access the data management system) to perform actions quicker, which may prevent losses incurred from the suspicious behavior and non-compliance of laws and regulations.

In some embodiments, to enhance the performance of data analyses, the data management system may generate a consolidated data view that combines related data across different enterprise data model instances based on the index values stored in the enterprise data model instances. For example, the data management system may generate a consolidated data view that includes transaction data associated with transactions conducted with various entities using the same credit card. Thus, the data management system may query different enterprise data model instances using an index value corresponding to a particular credit card number stored in the value and retrieve transaction data from multiple enterprise data model instances. The data management system may present the retrieved data according to the consolidated data view on a user device.

In some embodiments, the data management system may also analyze the retrieved data based on the consolidated data view to produce an outcome. For example, the data management system may analyze a risk associated with a pending transaction that is conducted using a particular credit card. The data management system may access the vault to determine an index value corresponding to the particular credit card. The data management system may then generate a consolidated data view that combines transaction data of all past transactions conducted with different entities using that particular credit card based on the index value corresponding to the particular credit card number. The data management system may analyze the transaction data (e.g., using a machine learning model, etc.) and produce a risk score for the pending transaction. For example, the data management system may analyze location data associated with the past transactions, and may determine a lower risk score if the locations associated with past transactions conducted with different entities are consistent (e.g., within a particular distance threshold), and may determine a higher risk score if the locations associated with the past transactions conducted with different entities are inconsistent (e.g., apart by more than the particular distance threshold). In some embodiments, the data management system may determine to reject the pending transaction if two past transactions (even if they were conducted with different entities) were conducted in two different locations within a time threshold (e.g., within an hour, etc.).

In another example, the data management system may analyze a user based on data associated with the user from different entities such that a more comprehensive view of the user can be analyzed. In this example, the data management system may use a unique identifier (e.g., a social security number, an email address, a phone number, etc.) to identify a particular user, and may generate a consolidated data view for the particular user based on combining data associated with the particular user from different enterprise data model instances using the unique identifier. The data management system may present and/or analyze the data of the particular user based on the consolidated data view. Based on the comprehensive view of the user, the data management system may provide enhanced services for the particular user, such as providing enhanced product/service recommendations for the user based on the user's transaction patterns across multiple entities, a risk evaluation of the particular user based on the user's interaction with multiple entities, or other enhanced services.

In addition to providing unique views and analyses of different data associated with different entities, the data management system of some embodiments may also provide data quality control features for ensuring the quality of the data stored within the data management system. In some embodiments, the data management system may enable users (e.g., data consumers) to specify, via a user interface of the data management system, rules for different data types. For example, a rule may specify that data of a particular data type (e.g., a credit card number) must fall within a particular range (e.g., 16 digits, etc.). Another rule may specify that data of another data type (e.g., a product/service category) is one of the limited numbers of available options. Since the data consumers are the domain experts with respect to the data associated with the corresponding domain, the data management system may enable the data consumers to create different rule sets for the data being ingested from different data sources. In some embodiments, based on a configuration by the data consumers through the user interface, the data management system may be configured to perform the data quality control, based on the defined rule sets, at different control points in a data flow within the data management system.

For example, the data management system may perform the data quality control on the data in an online manner as the data is being ingested from the data sources (e.g., when the data is being transformed and mapped to the corresponding enterprise data model instances). The data management system may also perform the data quality control on the data in an offline manner when the data is stored in the corresponding enterprise data model instances.

In some embodiments, to ensure that the data stored in the enterprise data model instances is consistent with the data stored at the data storages of the entities, the data management system may also perform data reconciliation during client-facing API calls for the entities. Since each of the entities may still facilitate transactions with users and/or merchants, entity servers of the entities may receive API calls (e.g., from their users such as merchants or individual users, etc.) for accessing data. Each client application that is deployed at the data storages of the entities may be configured to monitor such API calls. When an API request call for accessing data within the data storage is detected, the client application may monitor any API response generated by the entity server in response to the API request call. The client application may obtain the data included in the API request call and may transmit the data to the server of the data management system.

The data management system may determine whether the data obtained from the API response is consistent (e.g., within a difference threshold, which can range from zero (e.g., no difference) to a predetermined number, such as based on the type of data) with the data stored within the data management system by comparing the data against a corresponding data record in the corresponding enterprise data model instance. If the data in the API response is consistent with the data stored within the data management system, the data management system may continue to monitor other API calls. However, if the data included in the API response is not consistent with the data stored within the data management system, the data management system may reconcile the inconsistency. For example, the data management system may transmit a notification to the entity server indicating the data inconsistency, and request the entity server to confirm a correct version of the data. In another example, the data management system may communicate with the client application to determine a change history of the data corresponding to the data record. The data management system may determine whether any changes to the data has been inadvertently discarded. The data management system may then correct the data stored in the enterprise data model instance based on the change history.

In some embodiments, in addition to the data control rule sets, the data management system may also enable data consumers to provide one or more machine learning models for analyzing the data stored in the enterprise data model instances. The one or more machine learning models may be "plugged" into the data management system to perform analysis to the data stored in the enterprise data model instances. The one or more machine learning models may be configured to detect anomalies and/or outliers of any data records stored in the enterprise data model instances. The one or more machine learning models may also be configured to classify data stored within the enterprise data model instances. In some embodiments, the data management system may train the one or more machine learning models using data from multiple enterprise data model instances such that the one or more machine learning models may learn patterns based on data associated with multiple entities, which can enhance the performance of the one or more machine learning models. In some embodiments, the data management system may train a machine learning model, that is configured to analyze data stored in a first enterprise data model instance, using data stored in a second enterprise data model instance. The cross-data training may also enhance the analysis performance of the machine learning models.

The various functionalities and features of the data management system will be illustrated in further detail by way of the figures. FIG. 1 illustrates a networked system 100, within which the data management system may be implemented according to one embodiment of the disclosure. Note that the present techniques may be applied in many different computing and technological environments, however, and are not limited to those shown in the figures. The networked system 100 includes a service provider server 110, adjacency servers 120, 130, and 140, and user devices 180 and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

Each of the user devices 180 and 190, in one embodiment, may be utilized by a corresponding user to interact with any one of the adjacency servers 120, 130, and 140, and/or the service provider server 110 over the network 160. For example, each of the adjacency servers 120, 130, and 140, and the service provider server 110 may be associated with an entity with which a user may conduct transactions. In one particular example, at least some of the adjacency servers 120, 130, and 140, and the service provider server 110 may be associated with different payment service providers configured to conduct payment transactions (e.g., purchase transactions, peer-to-peer payment transactions, etc.) for users. Thus, a user of the user device 180 may use the user device 180 to conduct an online transaction with any one of the adjacency servers 120, 130, and 140, and the service provider server 110 via websites hosted by, or mobile applications associated with, the corresponding server. Each of the user devices 180 and 190, in various embodiments, may be implemented using any appropriate combination of hardware and/or software configured for wired and/or wireless communication over the network 160. In various implementations, each of the user devices 180 and 190 may include at least one of a wireless cellular phone, wearable computing device, PC, laptop, etc.

Each of the adjacency servers 120, 130, and 140 may be maintained by a business entity (or in some cases, by a partner of a business entity that processes transactions on behalf of business entity). Examples of business entities include merchants, resource information providers, payment transaction providers, utility providers, real estate management providers, social networking platforms, etc., which offer various items for viewing, accessing, and/or purchasing, and process payments for the purchases. As shown, each of the adjacency servers 120, 130, and 130 may include a data storage (e.g., data storages 124, 134, and 144) for storing data (e.g., user data, transaction data, etc.) associated with the users and transactions conducted by users (e.g., users of the user devices 180 and 190, etc.) through the corresponding business entities. In some embodiments, each business entity associated with an adjacency server may store the data according to a distinct data model schema (unique to the business entity) based on the data types that are relevant to the business entity. As such, each of the data storages 124, 134, and 144 may include different data structures (e.g., different tables) and different relationships among the data structures. The data stored in the data storages 124, 134, and 144 is not static, as new data may be added to the data storages 124, 134, and 144 (e.g., new transactions being conducted with the corresponding business entities, new users added to the business entities, etc.) and existing data in the data storages 124, 134, and 144 may be modified.

Each of the adjacency servers 120, 130, and 140 may also include a corresponding data management application (e.g., data management applications 122, 132, and 142) that is part of the data management system and implements the client applications as described herein. The data management applications 122, 132, and 142 are configured to communicate with a data management module 116 of service provider server 110 to facilitate ingestion of data from the data storages 124, 134, and 144 for the data management system. Since the data storages 124, 134, and 144 are controlled and operated by the corresponding entities (and associated servers 120, 130, and 130) and not the data management system, the data management applications 122, 132, and 142 may access the data in the data storages 124, 134, and 144, respectively via an interface (e.g., an application programming interface (API)) associated with the corresponding servers 120, 130, and 140.

While only three adjacency servers 120, 130, and 140 are shown in FIG. 1, it has been contemplated that any number of adjacency servers, each associated with a different business entity, may be connected to the user devices 180 and 190 and the service provider server 110 via the network 160.

The service provider server 110, in one embodiment, may be maintained by a transaction processing entity or an online service provider, which may provide processing for electronic transactions between the users of the user devices 180, and 190, and one or more merchants or other types of payees. As such, the service provider server 110 may be adapted to interact with the user devices 180, and 190, and/or merchant servers over the network 160 to facilitate the searching, selection, purchase, payment of items, and/or other services offered by the service provider server 110. In one example, the service provider server 110 may be provided by PayPal®, Inc., of San Jose, California, USA, and/or one or more service entities or a respective intermediary that may provide multiple point of sale devices at various locations to facilitate transaction routings between merchants and, for example, service entities.

The service provider server 110, in one embodiment, may be configured to maintain one or more user accounts and merchant accounts in a data storage 114, each of which may be associated with a profile and may include account information associated with one or more individual users (e.g., the users associated with the user devices 180 and 190) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions. In some embodiments, the service provider server 110 may store the data in the data storage 114 according to a data model schema unique to the service provider server 110.

In one implementation, a user may have identity attributes stored with the service provider server 110, and the user may have credentials to authenticate or verify identity with the service provider server 110. User attributes may include PII, banking information and/or funding sources. In various aspects, the user attributes may be passed to the service provider server 110 as part of a login, search, selection, purchase, and/or payment request, and the user attributes may be utilized by the service provider server 110 to associate the user with one or more particular user accounts maintained by the service provider server 110 and used to determine the authenticity of a request from a user device.

In some embodiments, the service provider server 116 may also include a data management application 112 that is part of the data management system. The data management application 112 performs similar functions as the data management applications 122, 132, and 142 for the corresponding adjacency servers. In particular, the data management application 112 is configured to communicate with the data management module 116 to facilitate ingestion of data from the data storage 114 for the data management system.

In various embodiments, data management module 116 implements part of the data management system as discussed herein. Although the data management module 116 is shown to be implemented within the service provider server 110, in some embodiments, the data management module 116 may be implemented in another device (e.g., another server, one of the adjacency servers 120, 130, and 140, etc.). As the service provider associated with the service provider server 110 expands, other business entities, such as the business entities associated with the adjacency servers 120, 130, and 140 may become affiliated with the service provider. The business entities associated with the adjacency servers 120, 130, and 140 may be referred to as "adjacencies" of the service provider. To integrate the various business entities with the service provider, the data management module 116 may collaborate with the various data management applications 112, 122, 132, and 142 to automatically integrate the data associated with the different entities (e.g., the service provider and the business entities associated with the adjacency servers 120, 130, and 140) and provide consolidated data views and collective analyses of the data associated with the different entities.

For example, the data management module 116 may define an enterprise data model schema that specifies uniform definitions of all data types associated with the various entities (including the service provider and the affiliated business entities) and uniform relationships among the data types and various data structures for storing data associated with the entities. As discussed herein, each of the data storages 114, 124, 134, and 144 store data in a manner (e.g., organization) according to a different data model schema associated with the corresponding entity. It is because each business entity may include a different set of data types and organize the set of data types in a way that is relevant and specific to the business operations of the entity. For example, the adjacency server 120 may enable its users to conduct transactions using digital wallets. As such, the adjacency server 120 may configure the data storage 124 to store data associated with digital wallet attributes. On the other hand, the adjacency server 130 may enable its users to conduct transactions using bank accounts instead of digital wallets. As such, the adjacency server 130 may configure the data storage 134 to include data associated with bank account attributes instead of digital wallet attributes. Furthermore, while some of the data storages 114, 124, 134, and 144 share common data types, each of the data storages 114, 124, 134, and 144 may define the data type differently. For example, a data type related to a "payment" attribute may be defined as a payment for a purchase with a merchant for one entity while a data type related to the "payment" attribute may be defined as a peer-to-peer payment for another entity.

Thus, in some embodiments, the data management module 116 may access the data storages 114, 124, 134, and 144 to determine metadata of the data storages 114, 124, 134, and 144, such as the data types, the data structures, and relationships among the data types and data structures for the corresponding data storages. Based on analyzing the metadata of the data storages 114, 124, 134, and 144, the data management module 116 may define the enterprise data model schema. The enterprise data model schema may encompass all of the data types used by the data storages 114, 124, 134, and 144 for storing data. Thus, the enterprise data model schema may include data types used by the data storage 124 for storing data related to digital wallet attributes and also data types used by the data storage 134 for storing data related to bank account attributes. The enterprise data model schema may also provide uniform definitions for all of the data types. For example, the enterprise data model schema may include a "merchant payment" data type specifically for payments related to purchases with merchants, and a "peer-to-peer payment" data type specifically for peer-to-peer payments.

Based on the enterprise data model schema, the data management module 116 may create an enterprise data model instance for storing data associated with each of the entities. The data management module 116 may communicate with the data management applications 112, 122, 132, and 142 to facilitate ingestion of data from the data storages 114, 124, 134, and 144. In some embodiments, once the data from the data storages 114, 124, 134, and 144 have been ingested, the data management module 116 may enable other computer devices and/or computer software applications to access the data stored in the enterprise data model instances using a uniform interface and protocol.

Figure 2:
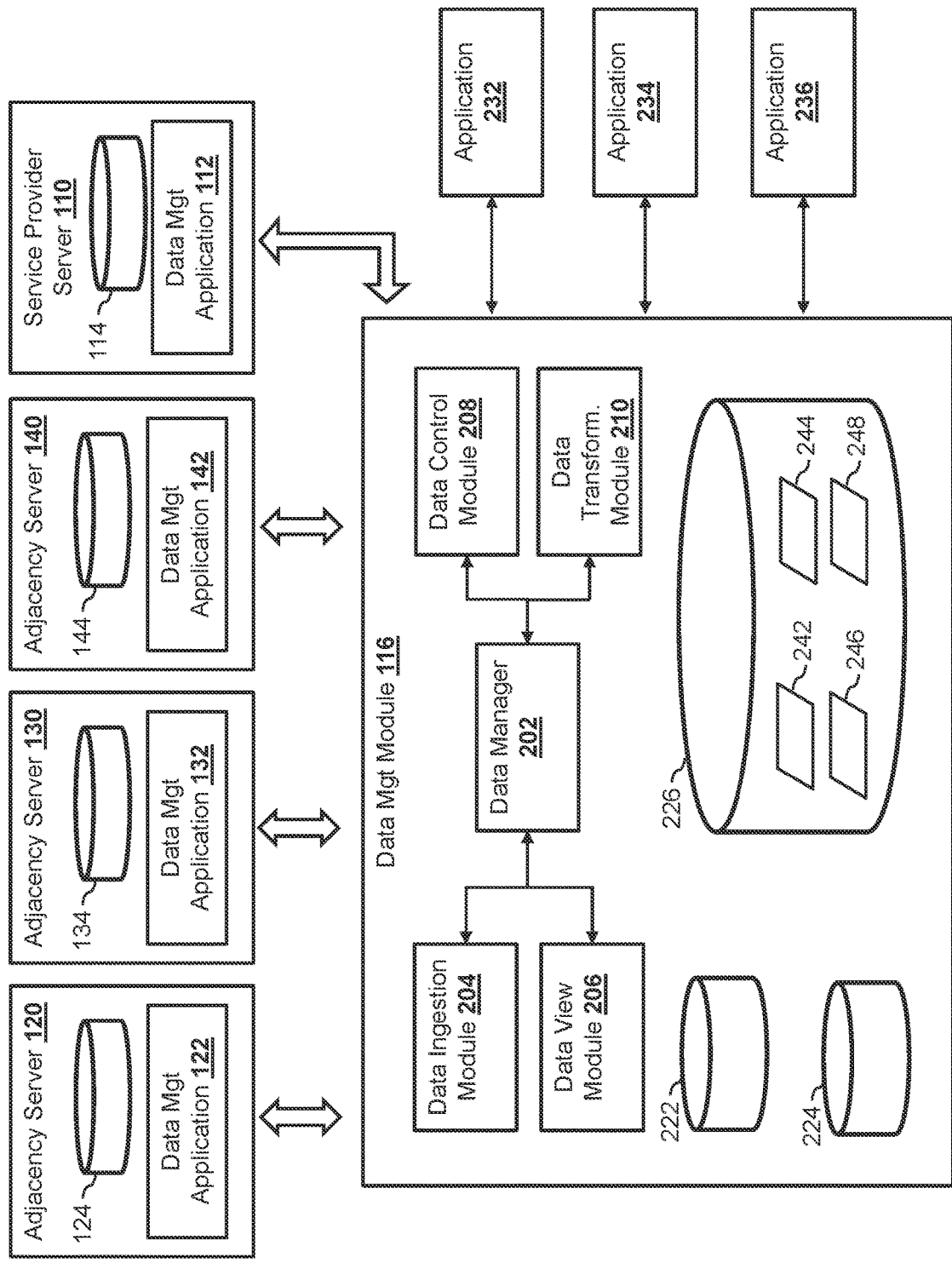
FIG. 2 is a block diagram illustrating a data management module according to an embodiment of the present disclosure.

FIG. 2 illustrates a block diagram of the data management module 116 according to an embodiment of the disclosure. The data management module 116 includes a data manager 202, a data ingestion module 204, a data view module 206, a data control module 208, and a data transformation module 210. As shown, the data management module 116 may be communicatively coupled with the data management applications 112, 122, 132, and 142 that are deployed at the service provider server 110 and the adjacency servers 120, 130, and 140, respectively. Each of the data management applications 112, 122, 132, and 142 may be configured to obtain data from the data storages 114, 124, 134, and 144, respectively, and transmit the data to the data management module 116.

In some embodiments, the data manager 202 may generate different enterprise data model instances 242, 244, 246, and 248 for storing data associated with different adjacency servers 120, 130, and 140. The data model instances 242, 244, 246, and 248 may be stored in a data storage 226 that is separate from the data storage 114 of the service provider server 110. Each of the enterprise data model instances 242, 244, 246, and 248 may be generated based on the enterprise data model schema, such that each enterprise data model instance may include data structures (e.g., tables, lists, etc.) and links between the data structures according to the enterprise data model schema. As such, the data structures and the way that the data structures are linked are identical for each of the data model instances 242, 244, 246, and 248. As the data is ingested from a data management application, the data ingestion module 204 may store the data within a corresponding enterprise data model instance.

For example, the data management application 122 may obtain data from the data storage 114 of the service provider server 110 (e.g., via an API associated with the service provider server 110). The data management application 112 may transmit the data to the data management module 116. As discussed herein, the data, when stored at the data storage 114, is stored in data structures according to a data model schema associated with the service provider server 110, which may be different from the enterprise data model schema defined by the data management module 116. As such, the data ingestion module 204 of some embodiments may map the data from the data model schema associated with the service provider server 110 to the enterprise data model schema, and store the data in the enterprise data model instance 242 based on the mapping. Similarly, when the data ingestion module 204 receives data from the data management application 122, the data ingestion module 204 may map the data from the data model schema associated with the adjacency server 120 to the enterprise data model schema, and store the data in the enterprise data model instance 244 based on the mapping. When the data ingestion module 204 receives data from the data management application 132, the data ingestion module 204 may map the data from the data model schema associated with the adjacency server 130 to the enterprise data model schema, and store the data in the enterprise data model instance 246 based on the mapping. When the data ingestion module 204 receives data from the data management application 142, the data ingestion module 204 may map the data from the data model schema associated with the adjacency server 140 to the enterprise data model schema, and store the data in the enterprise data model instance 248 based on the mapping.

In some embodiments, before storing the data in the enterprise data model instances 242, 244, 246, and 248, the data transformation module 210 may perform one or more transformations to some of the data. The transformations performed by the data transformation module 210 may include normalizing the data such that data of the same (or similar type) across different entities may be stored in the enterprise data model instances according the same scale (e.g., a risk score between 0 to 100, a rating between 1 and 5, etc.). The transformation may also include converting the data to a common unit (e.g., U.S. dollars for a monetary amount, inches for length, etc.). Thus, after the initial ingestion of data from the data storages 114, 124, 134, and 144, the server may store a copy of data from each of the entities in a common format within the corresponding enterprise data model instances 242, 244, 246, and 248.

After the initial ingestion of data from the data storages 114, 124, 134, and 144, the data management module 116 may continue to update the data in the enterprise data model instances 242, 244, 246, and 248 based on updates to the data stored in the data storages 114, 124, 134, and 144. As discussed herein, since each of the entities may still conduct transactions with its users using its data storages, new data may continuously be added, and data may continuously be modified, in those data storages associated with the entities. As such, the data management module 116 and the data management applications 112, 122, 132, and 142 may continue to process the new data and data changes to ensure that the data within the data management module 116 is current.

In some embodiments, the data management module 116 may support different ingestion modes for ingesting data from the data storage associated with the organization and the adjacencies. Each of the data management applications 112, 122, 132, and 142 may be configured to obtain data from the data storages 114, 124, 134, and 144, respectively, according to the respective data ingestion mode specified for the servers 110, 120, 130, and 140, and transmit the data to the data management module 116. As such, each of the data management applications 112, 122, 132, and 142 may provide a user interface that enables an agent associated with the corresponding server (e.g., the service provider server 110, and the adjacency servers 120, 130, and 140) to configure a data ingestion mode.

In some embodiments, the data management module 116 and the data management applications 112, 122, 132, and 132 may support a push streaming mode, a push batch mode, and a pull batch mode. Through the corresponding user interface provided by a data management application, an agent of a server may specify a data ingestion mode based on their needs and requirements. When a data management application is configured to perform the data ingestion process in a push streaming mode, the data management application may monitor data of the data storage to detect any new data or a change of existing data at the data storage. As discussed herein, each of the servers 110, 120, 130, and 140 may continue to conduct transactions (e.g., purchase transactions, payment transactions, data access transactions, etc.) with its users. Data stored in the data storages 114, 124, 134, and 144 may be updated by the servers 110, 120, 130, and 140 as the transactions are conducted. The data management applications 112, 122, 132, and 142 may be configured to monitor any updates to the data in the data storages 114, 124, 134, and 144. For example, whenever any new data or a change of data is detected at the data storage, the corresponding data management application may obtain the new data or the data change, and may actively push (e.g., transmit via an application programming interface (API) associated with the data management module 116) the new data and/or the data change to the data management module 116.

When a data management application is configured to perform the data ingestion process in a push batch mode, the data management application may monitor data of the data storage to detect any new data or a change of existing data at the data storage. The data management application may obtain any new data and/or data changes during a time period (e.g., an hour, a day, etc.), and add the new data and/or the data changes to a batch data structure (e.g., a batch file, etc.). The data management application may then push (e.g., transmit via the API associated with the data management module 116) the batch file, which includes all the new data and data changes detected during a past time period, to the data management module 116 at predetermined times (e.g., periodically, etc.).

When a data management application is configured to perform the data ingestion process in a pull batch mode, the data management application may monitor data of the data storage to detect any new data or a change of existing data at the data storage. The data management application may obtain any new data and/or data changes, and add the new data and/or the data changes to a batch data structure (e.g., a batch file, etc.). When the data management application receives a signal (e.g., a pull signal) from the data management module 116, the client application may be configured to transmit, via an API associated with the data management module 116, the batch file, which includes all the new data and data changes detected since the last time the data management application transmitted a batch file to the data management module 116. After transmitting the batch file to the data management module 112, the data management application may clear the batch file, and may begin to record new data or data changes to the batch file again.

In some embodiments, the data management module 116 may provide different computer devices and/or computer software applications (e.g., applications 232, 234, and 236) access to the data stored in the enterprise data model instances 242, 244, 246, and 248. For example, through a particular protocol (e.g., SQL, etc.), the applications 232, 234, and 236 may retrieve any portions of the data stored in any one of the enterprise data model instances 242, 244, 246, and 248. Since the enterprise data model instances 242, 244, 246, and 248 have identical data structures (based on the same enterprise data model schema), each of the applications 232, 234, and 236 may easily access any data within any one of the enterprise data model instances as long as it has knowledge about the enterprise data model schema. As such, the data management module 116 may provide a uniform interface for any devices and/or applications for accessing data associated with the different entities.

In some embodiments, the data manager 202 may store copies of the enterprise data model instances 242, 244, 246, and 248 in different data storages (e.g., data storages 222 and 224) for different purposes. For example, the data manager 202 may also store a copy of the enterprise data model instances 242, 244, 246, and 248 in the data storage 222 for providing online access by the application s 232, 234, and

236. The data manager 202 may store a copy of the enterprise data model instances 242, 244, 246, and 248 in the data storage 222 for offline data analysis. Various machine learning models may be used to analyze the data stored in the enterprise data model instances 242, 244, 246, and 248. The analysis performed on the data by certain machine learning models may involve complex computations, which may take a long time. As such, it may be beneficial to perform such analyses offline such that the continuous data ingestion process and access by external applications are not affected by the analyses.

In some embodiments, based on the common enterprise data model schema, the data view module 206 may generate one or more consolidated data views for presentation and/or access by the data management module 116 and/or other computer software applications that access the data management module 116 (e.g., the applications 232, 234, and 236). Different data consumers (e.g., different departments and/or divisions of the service provider and entities, different external entities, etc.) may access and use the data stored in the data management module 116 differently. As such, while the common organization of the data according to the enterprise data model schema enables easier access to the data stored in the different enterprise data model instances 242, 244, 246, and 248, the organization of the data according to the enterprise data model schema may not be relevant or meaningful to all data consumers.

As such, data views can be generated to provide different virtual views of the data for different data consumers. A data view is a virtual and temporary data structure for visualization of at least a portion of the data stored in a data repository (e.g., in the enterprise data model instances). A data view may have an organization of various data types that is different from the way that the data is actually organized when it is stored in the enterprise data model instances. As such, data views can be useful for providing unique views or presentations of data based on different focuses.

Figure 3:
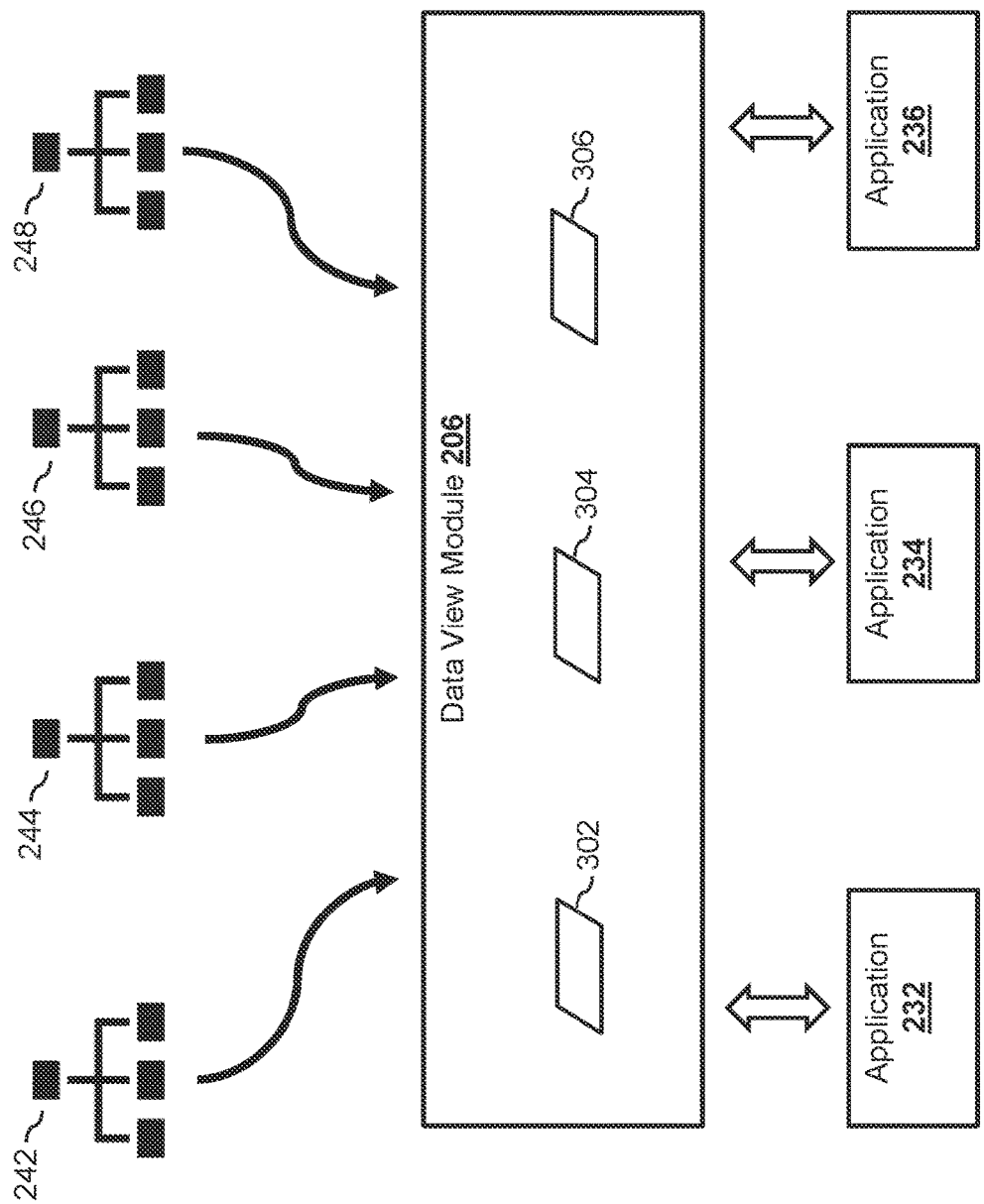
FIG. 3 illustrates the data management module generating and accessing of consolidated data views according to an embodiment of the present disclosure.

In some embodiments, the common enterprise data model schema used for storing data associated with different entities in the enterprise data model instances 242, 244, 246, and 248 enables the data view module 206 to generate consolidated data views that combine data from multiple enterprise data model instances. FIG. 3 illustrates example consolidated data views 302, 304, and 306 generated by the data view module 206 based on the enterprise data model instances 242, 244, 246, and 248. Each of the consolidated data views 302, 304, and 306 may include at least a particular subset of data types from the data types defined in the enterprise data model schema. Each of the consolidated data views 302, 304, and 306 may also have a particular organization of the particular subset of data types that is different from the way that the data is organized when it is stored in the enterprise data model instances 242, 244, 246, and 248. For example, a consolidated data view may combine data associated with data types that are stored in different data structures according to the enterprise data model schema into a single table (or any other data structure). Additionally, instead of viewing only the data from a single enterprise data model instance according to the data organization, each of the consolidated data views 302, 304, and 306 may generate the virtual and temporary data structure for presenting data that is merged from multiple enterprise data model instances.

For example, the data view module 206 may generate the consolidated data view 302 that compiles transaction data corresponding to a set of data types (e.g., transaction date, transaction amount, identity of the user conducting the transaction, etc.) related to transaction attributes from two or more of the enterprise data model instances 242, 244, 246, and 248 (e.g., payment transactions conducted with the different entities associated with the servers 110, 120, 130, and 140, etc.). As such, the consolidated data view 302 represents a collective view of all transactions that have been conducted with the entities associated with the servers 110, 120, 130, and 140. The data view module 206 may then present the data organized according to the consolidated data view 302 on a user device or transmit it to an application (e.g., the application 232) in response to a request from the application.

In another example, the data view module 206 may generate the consolidated data view 304 that compiles user data corresponding to a set of data types (e.g., name, residence location, contact information, gender, etc.) related to user attributes from two or more of the enterprise data model instances 242, 244, 246, and 248. As such, the consolidated data view 302 represents a collective view of all users of the entities associated with the servers 110, 120, 130, and 140. The data view module 206 may then present the data organized according to the consolidated data view 304 on a user device or transmit it to an application (e.g., the application 234) in response to a request from the application.

In some embodiments, instead of or in addition to presenting the consolidated data views 302, 304, and 306, the data view module 206 may further analyze the data organized under the consolidated data views 302, 304, and 306, and may provide an outcome of the analysis to a device or an application (e.g., the applications 232, 234, and 236). For example, using the consolidated data view 302, the data view module 206 may summarize the transaction data and generate an accounting report that may represent related transactions conducted with different entities. The data view module 206 may then present the account report on a user device or transmit the account report to a requesting application (e.g., the application 232). In another example, using the consolidated data view 304, the data view module 206 may generate a user report based on the user data that represents user accounts with different entities that are associated with common users. The data view module 206 may then present the user report on a user device or transmit the account report to a requesting application (e.g., the application 232). Thus, using the consolidated data view feature of the data management module 116, such reports can be more easily generated and presented to users.

In some embodiments, the data management module 116 may provide enhanced data security for the ingestion, storage, and management of data. For example, during ingestion of data from the data storages 114, 124, 134, and 144, each of the data management applications 112, 122, 132, and 142 deployed at the servers 110, 120, 130, and 140 may be configured to obtain the data from the corresponding data storage, encrypt the data (e.g., using a public key associated with the data management module 116), and then transmit the encrypted data to the data management module 116. Upon receiving the encrypted data, the data ingestion module 204 may use a private key corresponding to the public key to decrypt the encrypted data, prior to performing the data processing (e.g., transformation of data, mapping of data according to the enterprise data model schema, etc.) and storing the decrypted data in a corresponding enterprise data model instance.

Data that is stored in the data storages 114, 124, 134, and 144 associated with the different entities may be classified into different security levels. For example, any data can be classified into one of five security categories (e.g., Class 1 to Class 5), where Class 1 data has the highest sensitivity and Class 5 data has the lowest sensitivity. Data that has a high sensitivity classification (e.g., Class 2 or above, etc.), such as credit card data (e.g., credit card numbers,), PII data (e.g., social security numbers, license numbers, etc.), personal health information, and others, may be encrypted while stored in the data storages. Each server (e.g., the service provider server 110, the adjacency servers 120, 130, and 140) may use its own encryption algorithm and/or encryption key(s) to encrypt the sensitive data within its data storages. Thus, when the data is stored in the respective data storages of the different entities, it is a challenge to identify if a portion of data stored in the data storage 114 (e.g., transaction data associated with transactions conducted by a particular user with the service provider server 110) is related to a portion of data stored in the data storage 124 (e.g., transaction data associated with transactions conducted by the same user with the adjacency server 120).

As a data management application (e.g., the data management application 112) obtains the data from a corresponding data storage (e.g., the data storage 114), the data management application 112 may determine that certain data is classified as high sensitivity data (e.g., Class 2 data or above, etc.), indicating that the data has been encrypted by the service provider server 110. In some embodiments, the data management application 112 may use an API associated with the service provider server 110 to decrypt the encrypted data. The data may be decrypted using the encryption algorithm and the encryption key associated with the service provider server 110. After the decrypted data is obtained (via the API), the data management application 112 may then re-encrypt the data using the public key of the data management module 116 before transmitting the encrypted data to the data management module 116. Since the data management application 112 is deployed and executed within the environment of the service provider server 110, the decryption of the data by the data management application 112 does not introduce any security risk for the service provider. Furthermore, since the data is immediately re-encrypted by the data management application 112 using the public key of the data management module 116 before transmitting to the data management module 116, the security of the data is ensured. In some embodiments, the other data management applications 122, 132, and 142 may use the same techniques to handle the ingestion of sensitive data obtained from the corresponding data storages 124, 134, and 144.

As discussed herein, once the data is received by the data management module 116, the data ingestion module 204 may decrypt the data using the corresponding private key. In some embodiments, the data ingestion module 204 may identify highly sensitive data (e.g., data that has been classified as Class 2 or above, etc.) among the data received from a data management application. For example, the data received from the data storage 114 may include transaction data associated with transactions conducted with the service provider server 110. The transaction data may include sensitive data such as credit card numbers, bank account numbers, social security numbers, or PII. Upon identifying the sensitive data, the data ingestion module 204 may store the sensitive data in a data vault. The data vault may be implemented as a data storage that is separate from the enterprise data model instances 242, 244, 246, and 248. In some embodiments, the data vault may be implemented in a physical data storage device that is different from the physical data storage device(s) configured to store the enterprise data model instances 242, 244, 246, and 248 to isolate the data vault from the enterprise data model instances 242, 244, 246, and 248. This way, the data management module 116 may allow certain devices and/or software applications to access the enterprise data model instances 242, 244, 246, and 248, but not the data vault to further enhance the data security of the sensitive data stored in the data vault.

In some embodiments, the data ingestion module 204 may create a data record, in the data vault, for each distinct sensitive data it receives from any one of the data management applications. Each data record may include an index value (e.g., a primary key, etc.). The data ingestion module 204 may store the sensitive data received from a data management application in the corresponding data record in the vault. In some embodiments, the data ingestion module 204 may also encrypt the sensitive data before storing the encrypted sensitive data in the data record to further improve the security of the sensitive data.

Figure 4:
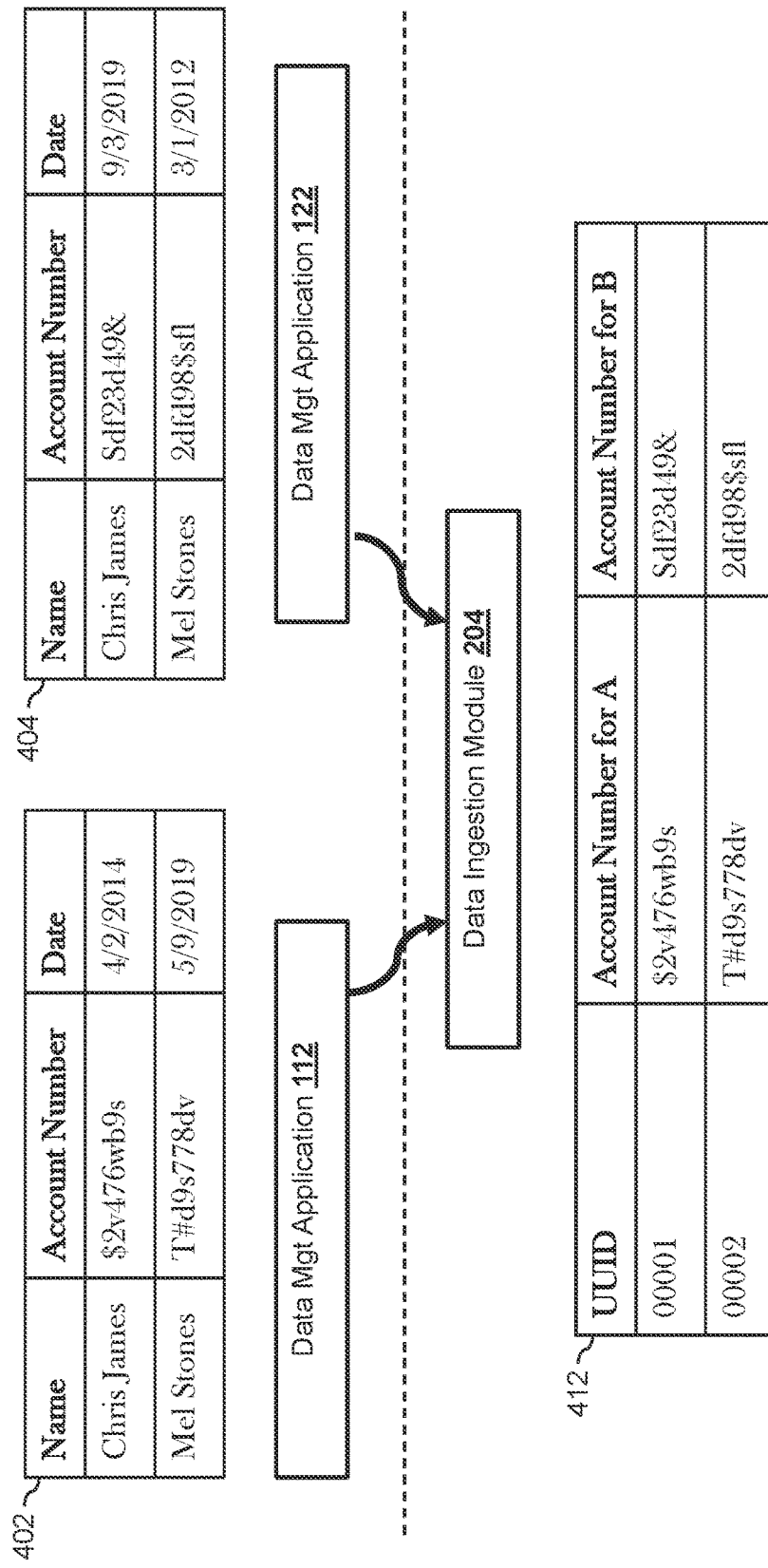
FIG. 4 illustrates an ingestion of sensitive data in a secured manner according to an embodiment of the present disclosure.

FIG. 4 illustrates an example of performing ingestion of sensitive data by the data management module 116 according to one embodiment of the disclosure. As shown, the data ingestion module 204 may receive data from data management applications 112 and 122. In this example, the data ingestion module 204 may receive two data records 402 from the data storage 114. Each data record may include a name of a person, a bank account number, and a date. Among the data in the data records 402, the bank account number is classified as sensitive data (e.g., Class 2 or above). When the data record 402 was stored in the data storage 114, the bank account numbers are encrypted using an encryption algorithm and/or an encryption key associated with the service provider server 110. As the data management application 112 obtains the data records 402, the data management application 112 may decrypt, via an API associated with the service provider server 110, the bank account numbers in the data records 402. The data management application 112 may then encrypt the entire data records 402 or re-encrypt only the bank account numbers in the data records 402 before transmitting the data records 402 to the data management module 116. In some embodiments, the data management application 112 may also transmit the originally encrypted bank account numbers (that was encrypted using the encryption algorithm and/or the encryption key associated with the service provider server 110) to the data management module 116.

Upon receiving the data records 402, the data ingestion module 204 may decrypt the data records 402, and may determine that the bank account numbers are sensitive data. Thus, instead of storing the data records 402, as is, in the enterprise data model instance 422, the data ingestion module 402 may first store the bank account numbers included in the data records 402 in a data vault 412. Since the bank account numbers in the data records 402 do not exist in the data vault 412 yet, the data ingestion module 204 may create two data records in the data vault 412 to store the bank account numbers. For example, the data ingestion module 204 may store the bank account number of user "Chris James" in a first data record having an index value (e.g., a primary key) of "00001," and store the bank account number of user "Mel Stones" in a second data record having an index value (e.g., a primary key) of "00002." In some embodiments, the data ingestion module 204 may store the bank account numbers in clear text format in the data vault 412. In some embodiments, the data ingestion module 204 may encrypt the bank account numbers and store the encrypted bank account numbers in the data vault 412.

In some embodiments, the data ingestion module 204 may obtain the encrypted bank account numbers, that were encrypted using the encryption algorithm and/or encryption key associated with the service provider server 110, from the data storage 114 and also store the encrypted bank account numbers in the data vault 412. This way, the data vault 412 may include, for the sensitive data, an encrypted version of the sensitive data that corresponds to the sensitive data stored in the data storage 114. The data ingestion module 204 may then replace the bank account numbers in the data records 402 with the index values associated with the data vault 412 to generate the data records 422. The data ingestion module 204 may then further process the data records 422 (e.g., transformation and mapping) and store the data records 422 in the enterprise data model instance 242.

The data ingestion module 204 may also receive two data records 404 from the data management application 122. Each data record may also include a name of a person, a bank account number, and a date. The data management application 122 may use the same techniques as described above to obtain, decrypt, re-encrypt, and transmit the data records 404 to the data management module 116. Upon receiving the data records 404, the data ingestion module 204 may decrypt the data records 404, and may determine that the bank account numbers are sensitive data. Thus, instead of storing the data records 404, as is, in the enterprise data model instance 424, the data ingestion module 402 may first store the bank account numbers included in the data records 404 in a data vault 412. Since data records for these two bank account numbers have already been created in the data vault 412, the data ingestion module 204 may simply add these new instances of the bank account numbers in the data vault 412 (instead of creating new data records in the data vault 412). For example, the data ingestion module 204 may store the bank account number of user "Chris James" in a new column of the first data record having an index value (e.g., a primary key) of "00001," and store the bank account number of user "Mel Stones" in a new column of the second data record having an index value (e.g., a primary key) of "00002."

In some embodiments, the data ingestion module 204 may also obtain the encrypted bank account numbers, that were encrypted using the encryption algorithm and/or encryption key associated with the adjacency server 120, from the data storage 124 and store the encrypted bank account numbers in the data vault 412. This way, the data vault 412 may also include, for the sensitive data, an encrypted version of the sensitive data that corresponds to the sensitive data stored in the data storage 124. The data ingestion module 204 may then replace the bank account numbers in the data records 404 with the index values associated with the data vault 412 to generate the data records 424. The data ingestion module 204 may then further process the data records 424 (e.g., transformation and mapping) and store the data records 424 in the enterprise data model instance 244.

The way that sensitive data is being handled by the data management module 116 as described herein has several benefits. First, storing sensitive data in a data vault 412 separate from the enterprise data model instances further protects the sensitive data from unauthorized access as the data management module 116 may have a higher level of control over which parties have access to the enterprise data model instances only and which parties have access to the data vault. Second, using the index values in the enterprise data model instances to refer to the sensitive data stored in the data vault 412 enables the data management module 116 to efficiently compare sensitive data without exposing the actual sensitive data. For example, funding accounts (e.g., credit cards, bank accounts, etc.) that have been used to conduct transactions with different entities can be identified based on the index values representing the funding accounts stored in the enterprise data model instances 242, 244, 246, and 248 without revealing the sensitive data associated with the funding accounts. In another example, activities of the same users (e.g., using a residential address, contact information, user identification data such as license numbers, social security numbers, etc.) conducted with different entities can be tracked based on the index values representing the information of the users stored in the enterprise data model instances 242, 244, 246, and 248 without revealing the sensitive data associated with the user. In some embodiments, the data vault 412, and the data model instances 422 and 424 are stored in the data storage 226.

As such, in some embodiments, the data manager 202 may perform certain data analyses based on identifying related data across different enterprise data model instances 242, 244, 246, and 248. For example, the data manager 202 may determine patterns of related transactions conducted with different entities. The related transactions may be related based on a common attribute, such as a common funding source used (e.g., identical credit card numbers identified based on the common index values, etc.), a common user-identifier (e.g., identical social security numbers identified based on the common index values, etc.), a common address, etc. The data analyses may include determining whether the transaction pattern associated with the common attributes corresponds to a suspicious behavior (e.g., frauds, etc.). The data analyses may also include compliance of certain laws or regulations and tax preparations for certain jurisdictions. In some embodiments, the data manager 202 may perform such analyses of the data in response to a request received from an external computer device or application (e.g., the applications 232, 234, and 236). Thus, the data manager 202 may be configured to provide a result of the analyses to the requesting application. The ability to accumulate transaction data across various entities in real-time to perform such data analyses enables the data management module 116 (and other applications such as applications 232, 234, and 236) to perform actions quickly, which may prevent losses incurred from the suspicious behavior and non-compliance of laws and regulations.

In some embodiments, to enhance the performance of data analyses, the data manager 202 may generate a consolidated data view (e.g., the consolidated data view 302, 304, and 306, etc.) that combines related data across different enterprise data model instances 242, 244, 246, and 248 based on the index values associated with the data vault 412. For example, the data manager 202 may generate a consolidated data view that includes transaction data associated with transactions conducted with various entities using the same credit card, based on a particular index value that refers to a credit card number stored in the data vault 412. Thus, the data manager 202 may query different enterprise data model instances 242, 244, 246, and 248 using the particular index value and retrieve transaction data from multiple enterprise data model instances. The data manager 202 may present the retrieved data according to the consolidated data view on a user device or transmit the retrieved data to a requesting application (e.g., the applications 232, 234, and 236).

In some embodiments, the data manager 202 may also analyze the retrieved data based on the consolidated data view to produce an outcome. For example, the data manager 202 may be requested (e.g., by the application 232 or an entity) to determine a risk associated with a pending transaction conducted using a particular credit card with an entity (e.g., the entity associated with the adjacency server 130). In this example, the requesting party (e.g., the application 232) may be associated with an entity with which a user attempts to conduct a transaction (e.g., using a payment service provided by the entity to perform a payment transaction with a merchant, etc.). The data manager 202 may receive, from the application 232, a request to analyze a risk of the pending transaction. Upon receiving the request, the data manager 202 may access the data vault 412 to determine an index value corresponding to the particular credit card. The data manager 202 may then generate a consolidated data view that combines transaction data of all past transactions conducted with different servers (e.g., the service provider server 110 and the adjacency servers 120, 130, and 140) using that particular credit card based on the index value corresponding to the particular credit card number in the data vault 412.

The data manager 202 may analyze the transaction data (e.g., using a machine learning model, etc.) and produce a risk score for the pending transaction. For example, the data manager 202 may analyze location data associated with the past transactions, and may determine a lower risk score if the locations associated with past transactions conducted with different entities are consistent (e.g., within a particular distance threshold), and may determine a higher risk score if the locations associated with the past transactions conducted with different entities are inconsistent (e.g., apart by more than the particular distance threshold). In some embodiments, the data manager 202 may determine to reject the pending transaction if two past transactions (even if they were conducted with different entities) were conducted in two different locations within a time threshold (e.g., within an hour, etc.). By leveraging transaction data associated with multiple entities, the risk score determined by the data manager 202 for the pending transaction is more accurate and comprehensive than one determined based solely on data associated with a single entity. The data manager 202 may then transmit the determined risk to the application 232. The risk transmitted to the application 232 may include a risk score or an indication of whether to authorize or deny the transaction request.

In another example, the data manager 202 may analyze a user based on data associated with the user collected by different entities such that a more comprehensive view of the user can be analyzed. In this example, the data manager 202 may use a unique identifier (e.g., a social security number, an email address, a phone number, etc.) to identify a particular user, and may generate a consolidated data view for the particular user based on combining data associated with the particular user from different enterprise data model instances 242, 244, 246, and 248 using an index value that refers to the unique identifier in the data vault 412. The data manager 202 may present and/or analyze the data of the particular user based on the consolidated data view. Based on the comprehensive view of the user, the data management system may provide enhanced services for the particular user, such as providing enhanced product/service recommendations for the user based on the user's transaction patterns across multiple entities, a risk evaluation of the particular user based on the user's interaction with multiple entities, or other enhanced services. In some embodiments, when the risk evaluation of the particular user exceeds a threshold, the data manager 202 may transmit a notification to one or more of the servers 110, 120, 130, and 140 to cause the servers 110, 120, 130, and 140 to perform an action to the corresponding user accounts associated with the particular user. For example, each of the servers 110, 120, 130, and 140 may modify a security protocol for accessing a corresponding user account associated with the particular user for accessing the functionalities of the user account.

In addition to providing unique views and analyses of data associated with different entities, the data management system of some embodiments may also provide data quality control features for ensuring the quality of the data stored within the data management module 116. In some embodiments, the data management module 116 may enable users (e.g., data consumers) to specify, via a user interface of the data management module 116, rules for different data types. For example, a rule may specify that data of a particular data type (e.g., a credit card number) must fall within a particular number range (e.g., 16-digit numbers, etc.). Another rule may specify that data of another data type (e.g., a predetermined product/service category) is one of the limited numbers of available options. Another rule may specify that certain data type (e.g., dates) to have a particular data format (e.g., MMDDYY, etc.). Since the data consumers are the domain experts with respect to the data associated with the corresponding domain, the data management module 116 may enable the data consumers to create different rule sets for the data being ingested from the different data storages 114, 124, 134, and 144.

In some embodiments, the data management module 116 may also generate (or enable various users to provide) one or more machine learning models for detecting abnormalities of the data being stored in the data management module 116. For example, the machine learning models may be trained with existing data stored in the enterprise data model instances 242, 244, 246, and 248. The machine learning models may extract patterns from the data stored in the enterprise data model instances 242, 244, 246, and 248. When new data is received by the data management module 116, the machine learning models may be used to determine whether the new data is inconsistent from the patterns associated with the existing data stored in the enterprise data model instances 242, 244, 246, and 248. In some embodiments, based on a configuration by the data consumers through the user interface, the data control module 208 may be configured to perform the data quality control, based on the defined rule sets and/or the machine learning models, at different control points in a data flow within the data management system.

Figure 5:
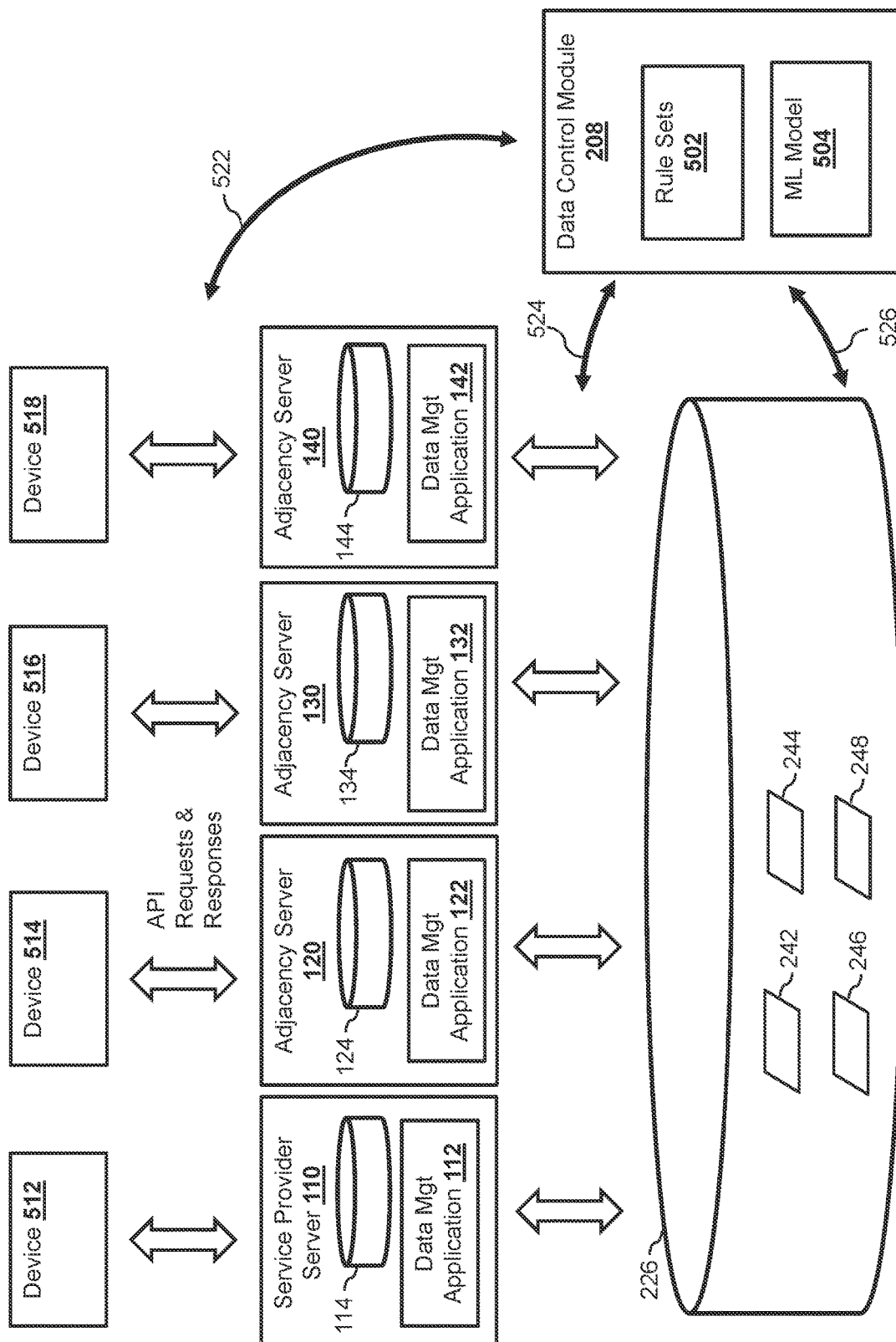
FIG. 5 illustrates various control points for performing data quality control according to an embodiment of the present disclosure.

FIG. 5 illustrates example data quality control features for the data management system according to various embodiments of the disclosure. As shown, the data control module 208 of some embodiments may perform data quality control at three different control points 522, 524, and 526. In some embodiments, the data control module 208 may store rule sets 502 and machine learning models 504 specified by various users (e.g., data consumers) or generated automatically by the data control module 208 in a data storage. The data control module 208 may then apply the rule sets 502 and/or the machine learning models 504 on the data during various stages within a data ingestion process. For example, the data control module 208 may perform data quality control in an online mode by applying the rule sets 502 and/or the machine learning models 504 at the control point 524 as the data is obtained from the data management applications 112, 122, 132, and 142.

Upon receiving the data by the data ingestion module 204, the data control module 208 of some embodiments may perform a data quality control process to the data using the rule sets 502 and/or the machine learning models 504 at the control point 524. If the data control module 208 determines that the data complies with all of the rules in the rule sets 502 and that the data is consistent with the existing data in all of the enterprise data model instances 242, 244, 246, and 248 using the machine learning models 504, the data control module 208 may send a signal to the data ingestion module 204, which enables the data ingestion module 204 to continue processing the data and storing the data in the corresponding enterprise data model instance using the techniques discussed herein. On the other hand, if the data control module 208 determines that the data does not comply with any of the rules in the rule sets 502, or that the data is inconsistent with the existing data in the enterprise data model instances 242, 244, 246, and 248 using the machine learning models 504, the data control module 208 may throw an exception. For example, the data control module 208 may request the data ingestion module 204 to stop ingesting the data that is not in compliance with the rule sets 502.

Furthermore, the data control module 208 may also transmit a notification to the data management application from which the data management module 116 receives the non-compliant and/or inconsistent data, notifying the data management application that the data does not comply with one or more rules and/or is not consistent with existing data. In some embodiments, the data control module 208 may use the data management application to verify the accuracy of the data that does not comply with the rule sets 502. For example, the data management application may access the data in the corresponding data storage again to determine that the data transmitted to the data management module 116 is accurate. The data management application may re-send the data obtained from the data storage to the data management module 116 if it is not accurate.

In some embodiments, the data control module 208 may also perform the data quality control process based on the rule sets 502 and/or the machine learning models 504 in an offline mode at the control point 526 after the data has been stored in an enterprise data model instance. Performing the data control process in the offline mode at the control point 526 is beneficial because performing the data quality control process may take a substantial amount of time (e.g., several seconds, several minutes, etc.), especially when the machine learning models 504 include complex computer algorithms. As such, performing some or all of the data quality control process during the data ingestion may significantly delay the ingestion of data and may create backlog. As such, after the new data has been processed and stored in an enterprise data model instance, the data control module 208 may perform (or continue to perform) the data quality control process on the new data.

Similar to performing the data quality control process at the control point 524, the data control module 208 may determine whether the new data complies with all of the rules in the rule sets 502 and that the data is consistent with other data in the enterprise data model instances using the machine learning models 504. If the data control module 208 determines that the data complies with all of the rules in the rule sets 502 and that the data is consistent with the existing data in all of the enterprise data model instances 242, 244, 246, and 248 using the machine learning models 504, the data control module 208 may not perform any actions. On the other hand, if the data control module 208 determines that the data does not comply with any of the rules in the rule sets 502, or that the data is inconsistent with the existing data in the enterprise data model instances 242, 244, 246, and 248 using the machine learning models 504, the data control module 208 may throw an exception. For example, the data control module 208 may transmit a notification to the data management application from which the data management module 116 receives the non-compliant and/or inconsistent data, notifying the data management application that the data does not comply with one or more rules and/or is not consistent with existing data. In some embodiments, the data control module 208 may use the data management application to verify the accuracy of the data that does not comply with the rule sets 502. For example, the data management application may access the data in the corresponding data storage again to determine that the data transmitted to the data management module 116 is accurate. The data management application may re-send the data obtained from the data storage to the data management module 116 if it is not accurate.

In some embodiments, to further ensure that the data stored in the enterprise data model instances 242, 244, 246, and 248 is consistent with the data stored at the data storages 114, 124, 134, and 144 of the entities, the data control module 208 may also perform data reconciliation at the control point 522, during client-facing API calls for the servers 110, 120, 130, and 140. Since servers 110, 120, 130, and 140 may still facilitate transactions with users and/or merchants of the corresponding entities, each of the servers 110, 120, 130, and 140 may receive API calls (e.g., from their users such as merchants or individual users, etc.) for accessing data stored in the data storages 114, 124, 134, and 144. Each of the data management applications 112, 122, 132, and 142 may be configured to monitor such API calls. When an API request call for accessing data within a data storage is detected, the corresponding data management application may monitor any API response generated by the server in response to the API request call. The data management application may obtain the data included in the API request call and may transmit the data to the data management module 116.

The data control module 208 may then determine whether the data obtained from the API response is consistent with the data stored within the data management module 116 (e.g., within the enterprise data model instances 242, 244, 246, and 248) by comparing the data against a corresponding data record in the corresponding enterprise data model instance. If the data in the API response is consistent with the data stored within the enterprise data model instance, the data control module 208 may continue to monitor other API calls. However, if the data included in the API response is not consistent with the data stored within the enterprise data model instance, the data control module 208 may reconcile the inconsistency. For example, the data control module 208 may transmit a notification to the server indicating the data inconsistency, and request the server to confirm a correct version of the data. In another example, the data control module 208 may communicate with the data management application to determine a change history of the data corresponding to the data record. The data management system may determine whether any changes to the data has been inadvertently discarded. The data control module 208 may then correct the data stored in the enterprise data model instance based on the change history.

Figure 6:
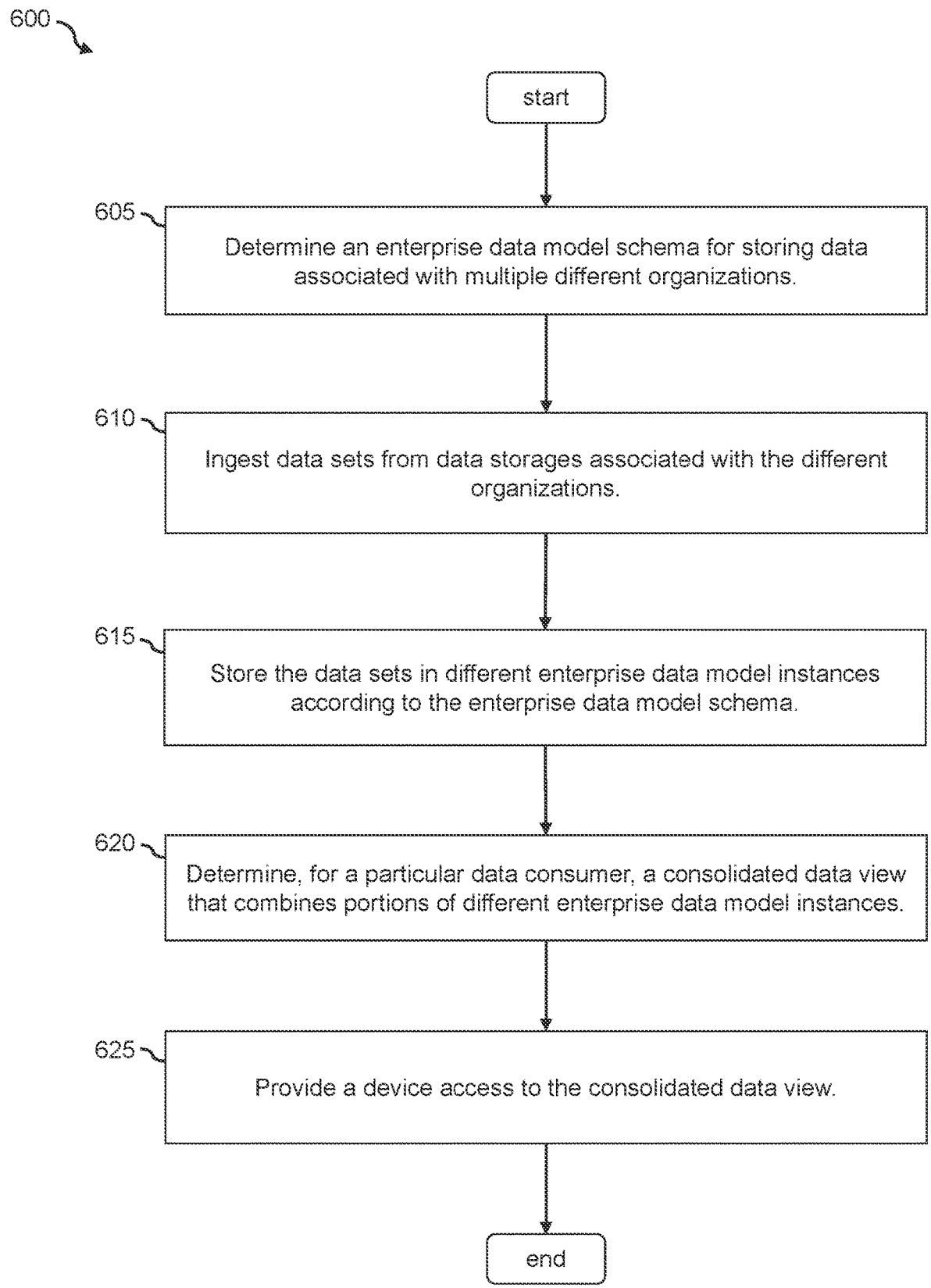
FIG. 6 is a flowchart showing a process of consolidating data from various entities according to an embodiment of the present disclosure.

FIG. 6 illustrates a process 600 for providing a central data repository for storing data associated with different entities according to various embodiments of the disclosure. In some embodiments, at least a portion of the process 600 may be performed by the data management module 116 and the data management applications 112, 122, 132, and 142. The process 600 may begin by determining (at step 605) an enterprise data model schema for storing data associated with multiple different organizations. For example, the data management module 116 may access metadata associated with various data storages (e.g., the data storages 114, 124, 134, and 144) of different entities. The data management module 116 may analyze the data types and the data structures (e.g., metadata) of the data storages 114, 124, 134, and 144 for storing the data associated with the different entities, and may determine an enterprise data model schema based on the analysis. The data model schema may specify and define the data structures within which the data associated with the different entities will be stored.

The process 600 then ingests (at step 610) data sets from data storages associated with the different organizations and stores (at step 615) the data sets in different enterprise data model instances according to the enterprise data model schema. For example, the data ingestion module 204 may communicate with various data management applications 112, 122, 132, and 142 deployed at different servers 110, 120, 130, and 140 to obtain data sets from the data storages 114, 124, 134, and 144 of the different servers 110, 120, 130, and 140. The data manager 202 may generate multiple enterprise data model instances for the different entities. Each enterprise data model instance may include one or more data structures based on the enterprise data model schema. As the data is received by the data ingestion module 204, the data transformation module 210 may process the data (e.g., performing normalization, conversion, and other kinds of transformations, etc.). The data ingestion module 204 may then map the data from a data model schema associated with the corresponding entity to the enterprise data model schema, and store the data in a corresponding enterprise data model instance according to the mapping.

The process 600 determines (at step 620), for a particular data consumer, a consolidated data view that combines portions of different enterprise data model instances. For example, the data view module 206 may receive a data request from any one of the applications 232, 234, and 236. The request may specify data types that the data consumer desire to view and/or analyze. Based on the request, the data view module 206 may generate one or more consolidated data views based on the enterprise data model schema and the enterprise data model instances. Each consolidated data view may combine portions of the data (corresponding to the requested data types) stored in two or more enterprise data model instances. The consolidated data view provides a collective view of the data from the different entities such that the data can be collectively viewed and/or analyzed. The process 600 then provides (at step 625) a device (or the requesting application) access to the consolidated data view. For example, the data view module 206 may provide the applications 232, 234, and 236 access to the one or more consolidated data views.

Figure 7:
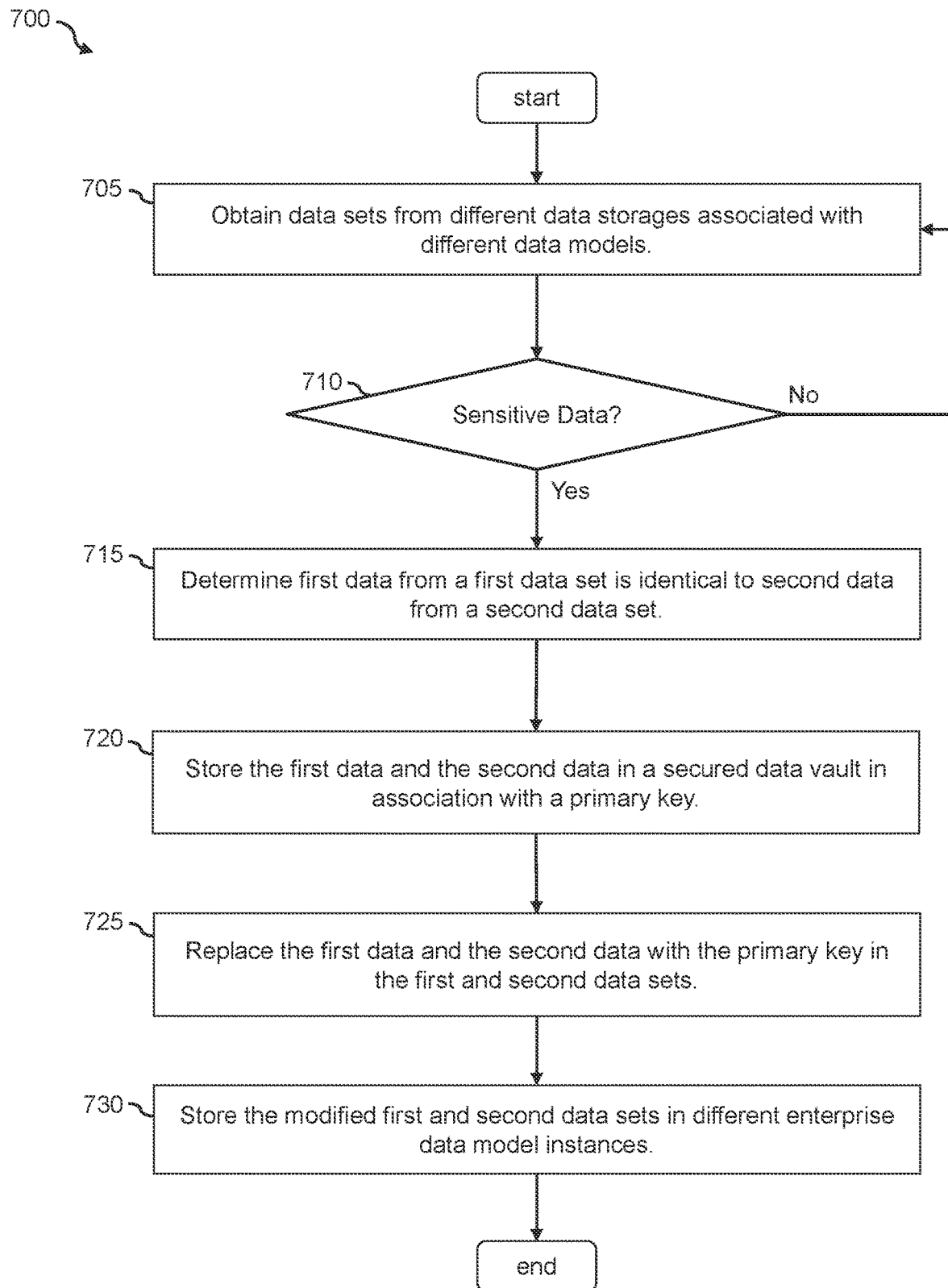
FIG. 7 is a flowchart showing a process of processing sensitive data from various entities according to an embodiment of the present disclosure.

FIG. 7 illustrates a process 700 for securely transmitting and storing sensitive data from various entities according to various embodiments of the disclosure. In some embodiments, at least a portion of the process 700 may be performed by the data management module 116 and the data management applications 112, 122, 132, and 142. The process 700 may begin by obtaining (at step 705) data sets from different data storages associated with different data models. For example, the data ingestion module 204 may receive data sets from data management applications 112, 122, 132, and 142. Each of the data management applications 112, 122, 132, and 142 may obtain data from the corresponding data storages 114, 124, 134, and 144. For example, the data management application 112 may encrypt a first data set from the data storage 114 using a public key associated with the data management module 116, and transmit the encrypted data to the data management module 116. The data management application 122 may encrypt a second data set from the data storage 124 using a public key associated with the data management module 116, and transmit the encrypted data to the data management module 116.

The process 700 determines (at step 710) whether the obtained data sets include any sensitive data. For example, the data ingestion module 204 may traverse the data sets obtained from the data management applications, and may identify data corresponding to predetermined sensitive data types (e.g., social security number, credit card numbers, etc.). When it is determined that no sensitive data is included within the data sets, the data ingestion module 204 may revert back to the step 705 and continue to obtain different data sets from different data storages. On the other hand, if it is determined that the obtained data sets include sensitive data, the process 700 then determines (at step 715) first data from a first data set is identical to second data from a second data set and stores (at step 720) the first data and the second data in a secured data vault in association with a primary key. For example, the data ingestion module 204 may determine that a first data value corresponding to a sensitive data type (e.g., a credit card number, a social security number, etc.) from the first data set is identical to a second data value corresponding to the sensitive data type from the second data set. Instead of processing the first data set and the second data set and storing the data sets in the corresponding enterprise data model instances, the data ingestion module 204 may store the first data and the second data in a single data record of the data vault 412.

The process 700 replaces (at step 725) the first data and the second data with the primary key in the first and second data sets and stores (at step 730) the modified first and second data sets in different enterprise data model instances. The data record of the data vault 412 that stores the first and second data may include an index value (e.g., a primary key) that uniquely identifies the data record in the data vault 412. As such, the data ingestion module 204 may replace the first data value with the index value in the first data set, and replace the second data value with the index value in the second data set before further processing the first and second data sets (e.g., by the data transformation module 210) and storing the first and second data sets in the enterprise data model instances 242 and 244, respectively.

Figure 8:
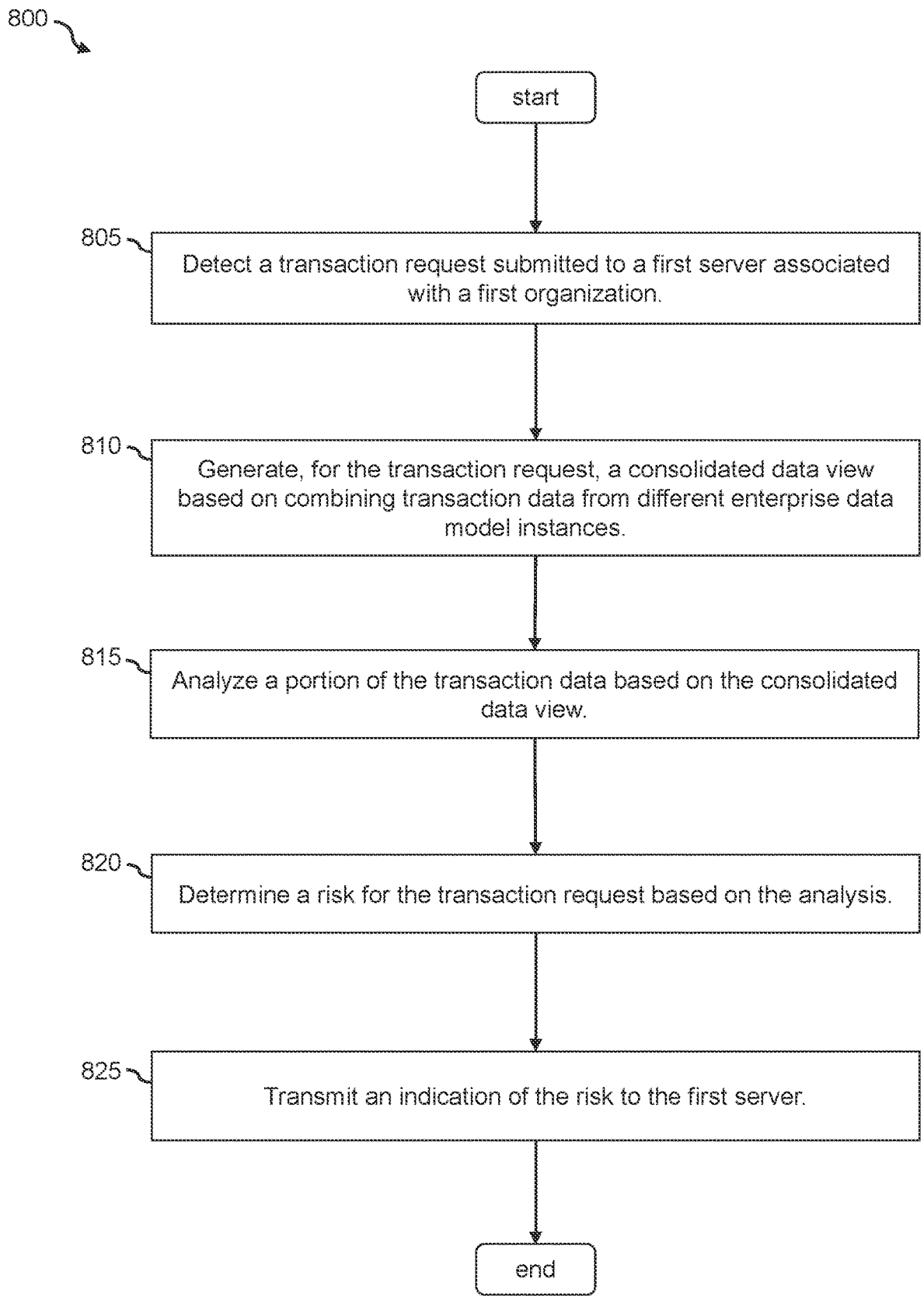
FIG. 8 is a flowchart showing a process of using a collective analysis of data from various entities stored with the data management system to perform a risk prediction according to an embodiment of the present disclosure.

FIG. 8 illustrates a process 800 for determining a risk for a pending transaction with an entity using a consolidated data view that combines data from multiple entities according to various embodiments of the disclosure. In some embodiments, at least a portion of the process 800 may be performed by the data management module 116 and the data management applications 112, 122, 132, and 142. The process 800 begins by detecting (at step 805) a transaction request submitted to a first server associated with a first organization. For example, each of the data management applications 112, 122, 132, and 142 may be configured to monitor any transactions conducted with the corresponding servers 110, 120, 130, and 140. When a transaction is being conducted with a server, the corresponding data management application may transmit transaction data of the pending transaction to the data management module 116.

The process 800 then generates (at step 810), for the transaction request, a consolidated data view based on combining transaction data from different enterprise data model instances and analyzes (at step 815) a portion of the transaction data based on the consolidated data view. For example, the data view module 206 may generate a consolidated data view that focuses on risk and transactions and that corresponds to the transaction type associated with the transaction requests. When the transaction request is a login request, the data view module 206 may generate a consolidated data view that include data types such as "login time" data type, "login location" data type, and other data types that related to attributes of login transactions. On the other hand, when the transaction request is a payment transaction, the data view module 206 may generate a consolidated data view that includes data types such as a "transaction amount" data type, a "merchant identity" data type, a "location" data type," and others. The data view module 206 may then retrieve relevant data (e.g., data values that correspond to the specified data types) from the enterprise data model instances 242, 244, 246, and 248 to be included in the consolidated data view. In some embodiments, the data manager 202 may analyze the data according to the consolidated data view. In some embodiments, the data manager 202 may train one or more machine learning model using the data from the consolidated data view, and use the machine learning model to predict a risk associated with the pending transaction.

The process 800 then determines (at step 820) a risk for the transaction request based on the analysis and transmits (at step 825) an indication of the risk to the first server. For example, after determining a risk for the pending transaction based on data from the consolidated data view, the data manager 202 may transmit the risk to the server via the corresponding data management application.

Figure 9:
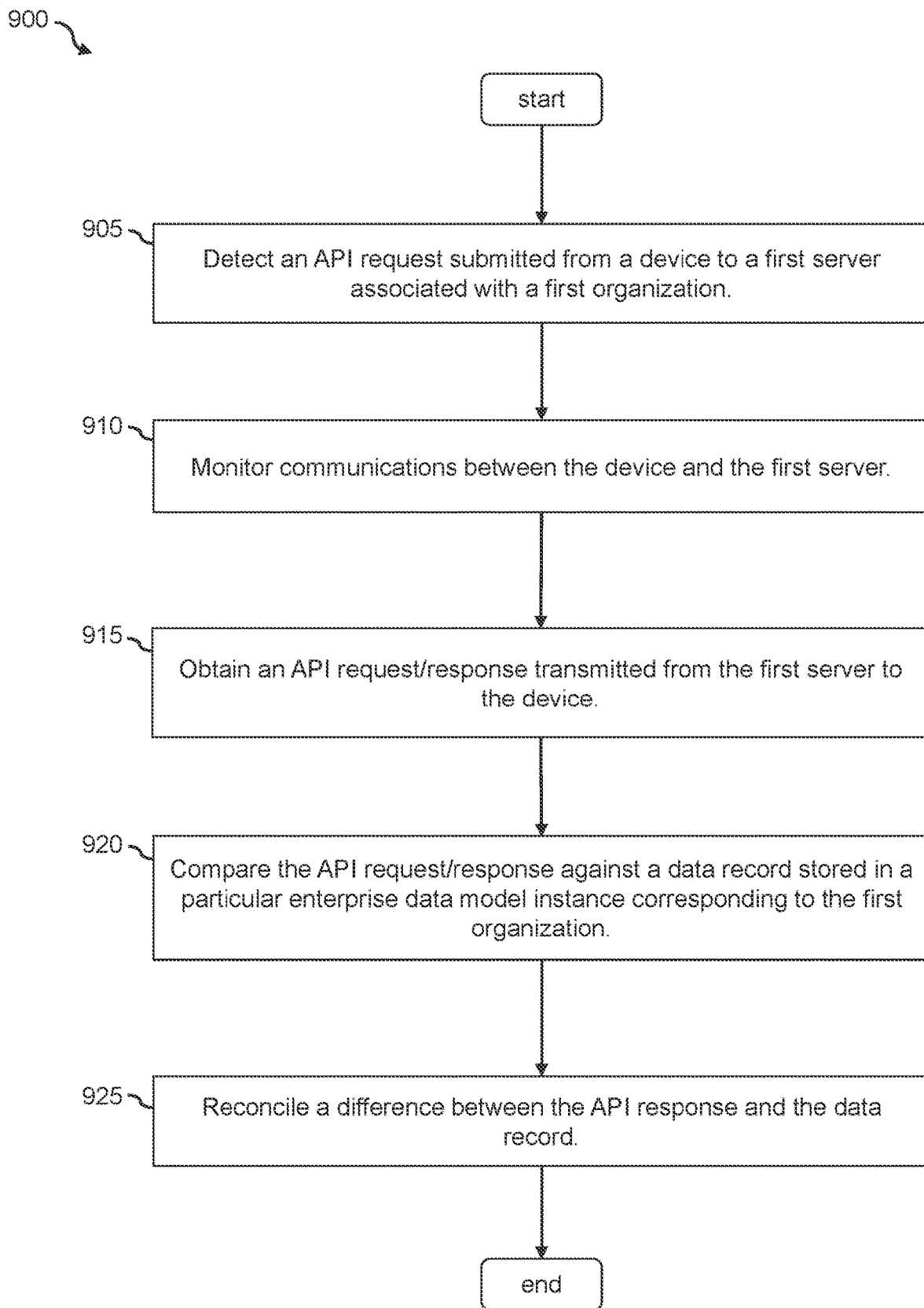
FIG. 9 is a flowchart showing a process of reconciling data inconsistencies based on monitoring API calls according to an embodiment of the present disclosure.

FIG. 9 illustrates a process 900 for reconciliating data inconsistencies via API calls according to various embodiments of the disclosure. In some embodiments, at least a portion of the process 900 may be performed by the data management module 116 and the data management applications 112, 122, 132, and 142. The process 900 begins by detecting (at step 905) an API request submitted from a device to a first server associated with a first organization. For example, a data management application may monitor any API calls received by the corresponding server, and may detect any API calls that a device (e.g., the device 512) transmitted to a server (e.g., the service provider server 110).

The process 900 then monitors (at step 910) communications between the device and the first server and obtains (at step 915) an API request and response transmitted from the first server to the device. For example, once detected an API call directed to the service provider server 110, the data management application 112 may monitor any communication between the service provider server 110 and the device 510. When the service provider server 110 transmits a response to the API call to the device 510, the data management application 112 may intercept the response and obtain the data included in the response. The data management application 112 may transmit the data included in the response to the data management module 116 to verify the accuracy of the data stored in the data management module 116.

The process 900 compares (at step 920) the API request and response against a data record stored in a particular enterprise data model instance corresponding to the first organization and reconciles (at step 925) a difference between the API response and the data record. For example, upon receiving the data from the data management application 112, the data control module 208 may determine a data record within the enterprise data model instance 242 based on the API call and/or the API response. The data control module 208 may compare the data included in the API response against the data stored in the data record. If the data from the API response is inconsistent with the data in the data record, the data control module 208 may work with the data management application 112 to reconcile the difference. In some embodiments, the data control module 208 may request the data management application 112 to provide a change history of the data in the data storage 114. If the data control module 208 determines that at least one data change has been inadvertently discarded (not processed) by the data management module 116, the data control module 208 may update the data stored in the data record of the enterprise data model instance 242 according to the change history.

FIG. 10 is a block diagram of a computer system 1000 suitable for implementing one or more embodiments of the present disclosure, including the service provider server 110, the adjacency servers 120, 130, and 140, and the user devices 180, and 190. In various implementations, each of the devices 180 and 190 may include a mobile cellular phone, personal computer (PC), laptop, wearable computing device, etc. adapted for wireless communication, and each of the servers 110, 120, 130, and 140 may include a network computing device, such as a server. Thus, it should be appreciated that the devices/servers 110, 120, 130, 140, 180, and 190 may be implemented as the computer system 1000 in a manner as follows.

The computer system 1000 includes a bus 1012 or other communication mechanism for communicating information data, signals, and information between various components of the computer system 1000. The components include an input/output (I/O) component 1004 that processes a user (i.e., sender, recipient, service provider) action, such as selecting keys from a keypad/keyboard, selecting one or more buttons or links, etc., and sends a corresponding signal to the bus 1012. The I/O component 1004 may also include an output component, such as a display 1002 and a cursor control 1008 (such as a keyboard, keypad, mouse, etc.). The display 1002 may be configured to present a login page for logging into a user account or a checkout page for purchasing an item from a merchant. An optional audio input/output component 1006 may also be included to allow a user to use voice for inputting information by converting audio signals. The audio I/O component 1006 may allow the user to hear audio. A transceiver or network interface 1020 transmits and receives signals between the computer system 1000 and other devices, such as another user device, a merchant server, or a service provider server via a network 1022, such as network 160 of FIG. 1. In one embodiment, the transmission is wireless, although other transmission mediums and methods may also be suitable. A processor 1014, which can be a micro-controller, digital signal processor (DSP), or other processing component, processes these various signals, such as for display on the computer system 1000 or transmission to other devices via a communication link 1024. The processor 1014 may also control transmission of information, such as cookies or IP addresses, to other devices.

The components of the computer system 1000 also include a system memory component 1010 (e.g., RAM), a static storage component 1016 (e.g., ROM), and/or a disk drive 1018 (e.g., a solid-state drive, a hard drive). The computer system 1000 performs specific operations by the processor 1014 and other components by executing one or more sequences of instructions contained in the system memory component 1010. For example, the processor 1014 can perform the data management functionalities described herein according to the processes 600, 700, 800, and 900.

Logic may be encoded in a computer readable medium, which may refer to any medium that participates in providing instructions to the processor 1014 for execution. Such a medium may take many forms, including but not limited to, non-volatile media, volatile media, and transmission media. In various implementations, non-volatile media includes optical or magnetic disks, volatile media includes dynamic memory, such as the system memory component 1010, and transmission media includes coaxial cables, copper wire, and fiber optics, including wires that comprise the bus 1012. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1000. In various other embodiments of the present disclosure, a plurality of computer systems 1000 coupled by the communication link 1024 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
  detecting a transaction request submitted by a user device of a user, wherein the transaction request is directed to a particular server associated with a particular organization from a plurality of organizations, wherein the plurality of organizations is associated with a plurality of respective servers storing data sets according to a plurality of respective data model schemas;
  accessing a plurality of enterprise data model instances stored in a local data storage of the system, wherein each of the plurality of enterprise data model instances stores a portion of the data sets associated with a corresponding organization from the plurality of organizations according to an enterprise data model schema, wherein the enterprise data model schema is different from the plurality of respective data model schemas, and wherein portions of the data sets were retrieved from the plurality of respective servers and mapped from the plurality of respective data model schemas to the enterprise data model schema;
  generating a consolidated data view that combines transaction data from two or more enterprise data model instances from the plurality of enterprise data model instances, wherein the transaction data represents transactions conducted with two or more organizations from the plurality of organizations;
  obtaining a portion of the transaction data associated with the user based on the consolidated data view and a common identifier representing the user across the two or more enterprise data model instances;
  determining, using a machine learning model, a risk associated with the transaction request based on the portion of the transaction data from the consolidated data view;
  determining to authorize or deny the transaction request based on the risk; and
  transmitting an indication to the particular server based on whether to authorize or deny the transaction request.

2. The system of claim 1, wherein the operations further comprise:
  ingesting the portions of the data sets from the plurality of respective servers associated with the plurality of organizations; and
  storing the portions of the data sets in the plurality of enterprise data model instances according to the enterprise data model schema based on mappings between the plurality of respective data model schemas and the enterprise data model schema.

3. The system of claim 2, wherein the ingesting the portions of the data sets comprises:
  retrieving a first portion of the data sets from a first server of the plurality of respective servers using a first database protocol; and retrieving a second data set from a second server of the plurality of respective servers using a second database protocol different from the first database protocol.

4. The system of claim 1, wherein the operations further comprise normalizing the portions of the data sets based on the enterprise data model schema.

5. The system of claim 1, wherein the two or more enterprise data model instances correspond to the two or more organizations different from the particular organization.

6. The system of claim 1, wherein the operations further comprise:
determining a first location associated with the transaction request based on location data obtained from the user device; and
determining, based on the portion of the transaction data, a second location associated with a second transaction conducted by the user with an organization different from the particular organization, wherein the risk associated with the transaction request is determined further based on a distance between the first location and the second location.

7. The system of claim 1, wherein the operations further comprise
determining, using a second machine learning model, that the transaction request is an anomaly based on the transaction data from the consolidated data view, wherein the risk of the transaction request is determined further based on the determining that the transaction request is an anomaly.

8. A method comprising:
detecting, by a computer system, a transaction request associated with an entity, wherein the transaction request is directed to a particular server associated with a particular organization from a plurality of organizations, wherein the plurality of organizations is associated with a plurality of respective data storages storing data according to a plurality of respective data model schemas;
accessing, by the computer system, a plurality of enterprise data model instances that stores the data associated with the plurality of organizations according to an enterprise data model schema different from the plurality of respective data model schemas, wherein the data was obtained from the plurality of respective data storages and mapped from the plurality of respective data model schemas to the enterprise data model schema;
generating a consolidated data view that combines transaction data from two or more enterprise data model instances from the plurality of enterprise data model instances, wherein the transaction data represents transactions conducted with two or more organizations from the plurality of organizations;
obtaining a portion of the transaction data associated with the entity based on the consolidated data view and a common identifier representing the entity across the two or more enterprise data model instances;
determining, using a machine learning model, a risk associated with the transaction request based on the portion of the transaction data from the consolidated data view;
determining to authorize or deny the transaction request based on the risk; and
transmitting an indication to the first server based on whether to authorize or deny the transaction request.

9. The method of claim 8, further comprising:
ingesting the data from the plurality of respective data storages associated with the plurality of organizations; and
storing the data in the plurality of enterprise data model instances according to the enterprise data model schema based on mappings between the plurality of respective data model schemas and the enterprise data model schema.

10. The method of claim 9, wherein the ingesting the data comprises:
retrieving a first data set from a first data storage of the plurality of respective data storages using a first database protocol; and
retrieving a second data set from a second data storage of the plurality of respective data storages using a second database protocol different from the first database protocol.

11. The method of claim 8, further comprising normalizing the data based on the enterprise data model schema.

12. The method of claim 8, wherein the two or more enterprise data model instances correspond to the two or more organizations different from the particular organization.

13. The method of claim 8, further comprising:
determining a first location associated with the transaction request; and
determining, based on the portion of the transaction data, a second location associated with a second transaction conducted by the entity with an organization different from the particular organization, wherein the risk associated with the transaction request is determined further based on a distance between the first location and the second location.

14. The method of claim 8, further comprising:
determining, using a second machine learning model, that the transaction request is an anomaly based on the transaction data from the consolidated data view, wherein the risk of the transaction request is determined further based on the determining that the transaction request is an anomaly.

15. A non-transitory machine-readable medium having stored thereon machine-readable instructions executable to cause a machine to perform operations comprising:
receiving a notification of a transaction request submitted by a user device of a user, wherein the transaction request is directed to a particular server associated with a particular organization from a plurality of organizations, wherein the plurality of organizations is associated with a plurality of respective servers storing data according to a plurality of respective data model schemas;
accessing a plurality of enterprise data model instances that stores the data associated with the plurality of organizations according to an enterprise data model schema different from the plurality of respective data model schemas, wherein each enterprise data model instance in the plurality of enterprise data model stores a portion of the data that was retrieved from a respective server;
retrieving, using a consolidated data view and a common identifier representing the user across the plurality of enterprise data model instances, transaction data associated with the user from two or more enterprise data model instances from the plurality of enterprise data model instances, wherein the transaction data represents transactions conducted with two or more organizations from the plurality of organizations;

determining, using a machine learning model, a risk associated with the transaction request based on the transaction data retrieved using the consolidated data view;

determining to authorize or deny the transaction request based on the risk; and transmitting an indication to the particular server based on whether to authorize or deny the transaction request.

16. The non-transitory machine-readable medium of claim 15, wherein the operations further comprise:

ingesting the data from the plurality of respective servers associated with the plurality of organizations; and storing a corresponding portion of the data in each of the plurality of enterprise data model instances according to a corresponding enterprise data model schema from the plurality of respective data model schemas based on mappings between the corresponding data model schema and the enterprise data model schema.

17. The non-transitory machine-readable medium of claim 16, wherein the ingesting the plurality of data sets comprises:

retrieving a first data set from a first server of the plurality of respective servers using a first database protocol; and retrieving a second data set from a second server of the plurality of respective servers using a second database protocol different from the first database protocol.

18. The non-transitory machine-readable medium of claim 15, wherein the two or more data model instance correspond to the two or more organizations different from the particular organization.

19. The non-transitory machine-readable medium of claim 15, wherein the operations further comprise:

determining a first location associated with the transaction request based on location data obtained from the user device; and determining, based on the transaction data, a second location associated with a second transaction conducted by the user with an organization different from the particular organization, wherein the risk associated with the transaction request is determined further based on a distance between the first location and the second location.

20. The non-transitory machine-readable medium of claim 15, wherein the operations further comprise determining, using a second machine learning model, that the transaction request is an anomaly based on the transaction data, wherein the risk of the transaction request is determined further based on the determining that the transaction request is an anomaly.

* * * * *